United States Patent [19]

Yoneda

[11] Patent Number: 5,681,084
[45] Date of Patent: Oct. 28, 1997

[54] CHILD SEAT APPARATUS

[75] Inventor: Yoshifumi Yoneda, Oska, Japan

[73] Assignee: Aprica Kassai Kabushikikaisha, Osaka, Japan

[21] Appl. No.: 529,159

[22] Filed: Sep. 15, 1995

[30] Foreign Application Priority Data

Oct. 20, 1994 [JP] Japan ................. 6-254937
Apr. 5, 1995 [JP] Japan ................. 7-080550

[51] Int. Cl.6 .................................. A47C 7/02
[52] U.S. Cl. ............ 297/284.9; 297/377; 297/464; 297/354.13; 297/452.4
[58] Field of Search ................. 297/284.9, 63, 297/64, 124, 452.34, 452.36, 452.4, 354.13, 464, 377

[56] References Cited

U.S. PATENT DOCUMENTS

| | | | |
|---|---|---|---|
| 1,527,754 | 2/1925 | Simon | 297/284.9 |
| 2,163,365 | 6/1939 | Terschmann | 297/452.4 |
| 2,607,400 | 8/1952 | Witz | 297/284.9 |
| 2,619,157 | 11/1952 | Guyton et al. | 297/284.9 |
| 4,653,805 | 3/1987 | Maloney | 297/284.9 |
| 4,776,632 | 10/1988 | Akimori et al. | 297/284.9 |

FOREIGN PATENT DOCUMENTS

| | | | |
|---|---|---|---|
| 0466489 | 1/1992 | European Pat. Off. | |
| 0646342 | 4/1995 | European Pat. Off. | |
| 0655379 | 5/1995 | European Pat. Off. | |
| 0168738 | 7/1987 | Japan | 297/284.9 |

Primary Examiner—Peter R. Brown
Assistant Examiner—Anthony D. Barfield
Attorney, Agent, or Firm—W. G. Fasse; W. F. Fasse

[57] ABSTRACT

A child seat apparatus includes a seat, a reclinable backrest, and at least either a pair of side guards rotatably mounted on the backrest or a pair of armrests mounted on the seat, wherein the lateral spacing between the side guards or the armrests is changeable. An interlocking mechanism links the backrest with the side guards or the armrests so that the space between the side guards or the armrests is changed in association with the inclination of the backrest. Specifically, this space is widened as the backrest is reclined. Such an interlocking mechanism, for example, includes driving pins that are driven with an upper end of a bridging bar for supporting the backrest in a reclined state while a pair of driven slots are provided in the side guards for receiving the driving pins respectively. The driven slots are directed at an angle relative to each other so as to be closer to each other at upper ends thereof. Due to this structure, a dimensional allowance is provided around the shoulders of a child when the backrest is reclined into the form of a bed.

19 Claims, 26 Drawing Sheets

CHILD SEAT APPARATUS

BACKGROUND OF THE INVENTION

1. Field of the Invention

The present invention relates to a child seat apparatus, and more particularly, it relates to a child seat apparatus that has side guards defining side walls on both sides of the upper half of a child sitting thereon for protecting the child, and armrest portions defining armrests on both sides of the waist of the child for protecting the child's lower half.

2. Description of the Background Art

An exemplary child seat apparatus is a child chair. The child chair is typically used indoors. Such a child chair comprises a seat portion and a backrest portion uprightly extending from the rear part of the seat portion. Some child chairs may further comprise first and second side guards defining a pair of side walls frontwardly extending from both side edges of the backrest portion respectively, and first and second armrest portions defining a pair of armrests upwardly extending from both side edges of the seat portion respectively, in order to improve safety for the child sitting thereon. Further, the backrest portion may be rendered inclinable or reclinable so that a child who falls asleep can recline thereon or the chair also serves as a bed for the child.

The aforementioned structure is applied not only to the child chair but also to other child seat apparatuses such as a baby carriage, a child safety seat for an automobile and the like, for example.

In the aforementioned child seat apparatus having an inclinable backrest portion and comprising a pair of side guards defining a pair of side walls frontwardly extending from both side edges of the backrest portion respectively, and first and second armrest portions defining a pair of armrests upwardly extending from both side edges of the seat portion respectively, the spaces or distances between the pair of side walls and the pair of armrests are generally set on the basis of the posture of the child who sits on the seat apparatus when the backrest portion is in an upright state. In other words, the pair of side walls and the pair of armrests are positioned at relatively narrow spaces or distances apart from one another to be capable of supporting the upper and lower halves of the child from both sides, in consideration of safety for the child who sits up on the seat portion.

When the backrest portion is so inclined that the seat is in the form of a bed for laying the child thereon, however, the child, particularly an infant, sometimes raises its hands, and tends to bend its knees. Therefore, the spaces between the pair of side walls and the pair of armrest portions which are set in the aforementioned manner may be too narrow for the child. It is desirable that the spaces between the pair of side walls and the pair of armrests are sufficient particularly around the shoulders and the waist of the child.

SUMMARY OF THE INVENTION

An object of the present invention is to provide a child chair or other child seat apparatus, which can provide relatively narrow spaces between a pair of side walls and a pair of armrests when a backrest portion is in a generally upright position in consideration of safety for a child who sits on this apparatus, while providing relatively wide spaces when the backrest portion is inclined, i.e. reclined.

According to its first aspect, the present invention is directed to a child chair apparatus comprising a seat portion and a backrest portion uprightly extending from the rear part of the seat portion so as to be inclinable relative thereto, and further comprising first and second side guards defining a pair of side walls frontwardly extending from both side edges of the backrest portion. In order to solve the aforementioned technical problem, the inventive child seat apparatus comprises a holding mechanism for holding the first and second side guards so that the space between the pair of side walls is changeable, and an interlocking mechanism for changing the space in association with inclination of the backrest portion so that the space is widened as the backrest portion is inclined.

According to its second aspect, the present invention is directed to a child chair apparatus comprising a seat portion and a backrest portion uprightly extending from the rear part of the seat portion so as to be inclinable relative thereto, and further comprising first and second armrest portions defining a pair of armrests upwardly extending from both side edges of the seat portion. In order to solve the aforementioned technical problem, the inventive child seat apparatus comprises a holding mechanism for holding the first and second armrest portions so that the space between the pair of armrests is changeable, and an interlocking mechanism for changing the space in association with inclination of the backrest portion so that the space is widened as the backrest portion is inclined.

According to the first aspect of the present invention, the space between the pair of side walls is changed in association with the inclination of the backrest portion so that this space is widened as the backrest portion is inclined.

According to the second aspect of the present invention, the space between the pair of armrests is changed in association with the inclination of the backrest portion so that this space is widened as the backrest portion is inclined.

According to the first aspect of the present invention, therefore, the space between the pair of side walls is made narrower when the backrest portion is moved into an upright position to straighten up the upper half of the child thereby ensuring safety for the child, while this space is widened when the backrest portion is inclined for the child to recline thereon, thereby preventing the child from feeling cramped.

The space between the pair of side walls is changed automatically so to speak, in association with the inclination of the backrest portion, whereby no specific operation is required for changing this space and the overall operation for this child seat apparatus is simplified.

The space between the pair of side walls is narrowed when the backrest portion is moved into an upright position, whereby this child seat apparatus is less bulky as compared with a conventional child seat apparatus having a pair of side walls which are regularly arranged with a wide space therebetween.

Preferably, the first and second side guards comprise first and second major surface walls extending along the backrest portion for positioning the side walls on outer side edges thereof respectively, and the holding mechanism comprises a mechanism for movably supporting the first and second major surface walls with respect to the backrest portion. Thus, the holding mechanism for making the space between the pair of side walls changeable can be implemented in a relatively simple structure.

More preferably, a shaft inclinably supports the backrest portion, and a bridging bar having a lower end rotatably mounted at a position different from that of the shaft and an upper end selectively fixed to any one of a plurality of positions vertically distributed on the rear surface of the backrest portion is employed, in order to adjust the inclined state of the backrest portion.

In this case, the aforementioned holding mechanism comprises pivot pins for rotatably supporting lower ends of the first and second major surface walls with respect to the backrest portion, while the interlocking mechanism for changing the space between the pair of side walls in association with the inclination of the backrest portion comprises a pair of driving pins mounted on the upper end of the bridging bar, a pair of guide slots that extend in parallel with each other are provided in the backrest portion for vertically movably receiving the pair of driving pins respectively, and a pair of driven slots are provided in the major surface walls of the pair of side guards respectively for receiving the pair of driving pins to be movable along longitudinal directions thereof.

The pair of driven slots are directed or oriented so as to approach each other toward the upper ends thereof. Due to this structure, it is possible to rotate the pair of side guards respectively through movement of the upper end of the bridging bar whose position is changed in response to the inclination of the backrest portion, thereby changing the space between the pair of side walls by a simple mechanism.

More preferably, the inventive child seat apparatus further comprises a head guard which is vertically rotatably mounted on the upper end of the backrest portion, and a mechanism for transmitting the operation of the upper end of the bridging bar to the head guard so that the head guard is moved into a position extending substantially flush and parallel with the backrest portion when it is most upright, and is moved into a position extending substantially upright or perpendicularly from the backrest portion when the backrest portion is most inclined. According to this structure, the head guard extends substantially flush with the backrest portion when the backrest portion is uprighted, and alternatively extends substantially upright from the backrest portion when the backrest portion is most inclined, whereby the safety of the child who lies on the child seat apparatus can be further improved. Further, the head guard is tilted upright in association with the inclination of the backrest portion, whereby no specific operation is required for moving the head guard and the overall operation of this child seat apparatus can be simplified.

According to the second aspect of the present invention, on the other hand, the space between the pair of armrests is narrowed when, i.e. made narrower, when the backrest portion is uprighted to straighten up the upper half of the child thereby ensuring safety for the child, while this space is widened when the backrest portion is inclined for the child to recline thereon, thereby preventing the child from feeling cramped.

The space between the pair of armrests is changed automatically, so to speak, in association with the inclination of the backrest portion, whereby no specific operation is required for changing this space and the operation for this child seat apparatus is simplified.

The space between the pair of armrests is narrowed when the backrest portion is moved into an upright position, whereby this child seat apparatus is less bulky as compared with a conventional child seat apparatus having a pair of armrests which are regularly arranged with a wide space therebetween.

Preferably, the first and second armrest portions comprise first and second major surface walls extending along the seat portion for positioning the armrests on outer side edges thereof respectively, and the holding mechanism comprises a mechanism for slidably supporting the first and second major surface walls with respect to the seat portion. Thus, the holding mechanism for making the space between the pair of armrests changeable can be implemented in a relatively simple structure.

More preferably, the backrest portion comprises a working plate which is fixed to a portion close to the lower end on the rear surface of the backrest portion, and the holding mechanism comprises first and third crosswisely extending guide slots provided in the vicinity of front and rear portions of the first major surface wall on the rear surface of the seat portion respectively, second and fourth crosswisely extending guide slots provided in the vicinity of front and rear portions of the second major surface wall on the rear surface of the seat portion, first and third driving pins provided in the vicinity of front and rear portions of the first major surface wall to be received in the first and third guide slots respectively so that the first major surface wall is movable along the first and third guide slots, and second and fourth driving pins provided in the vicinity of front and rear portions of the second major surface wall to be received in the second and fourth guide slots respectively so that the second major surface wall is movable along the second and fourth guide slots. Further preferably, the aforementioned interlocking mechanism comprises a working pin having a rear end rotatably mounted on the working plate, a sliding plate pivotally supporting a front end of the working pin, which is lengthwisely slidable at a substantially central portion on the rear surface of the backrest portion, first and second connecting pins provided on front and rear ends of the sliding plate respectively, first and third connecting plates connecting the first and second connecting pins with the first and third driving pins respectively to horizontally slide the first armrest portion following or linked to the lengthwise movement of the sliding plate, and second and fourth connecting plates for connecting the first and second connecting pins with the second and fourth driving pins to horizontally slide the second armrest portion following or linked to the lengthwise movement of the sliding plate.

According to this structure, the first to fourth connecting plates operate in response to the lengthwise movement of the sliding plate through movement of the working plate which is rotated in response to the inclination of the backrest portion, for horizontally sliding the first and second armrest portions. Thus, the space between the pair of armrest portions can be reliably changed by a simple mechanism.

Further preferably, an extension plate is provided on the front portion of the sliding plate to project from the front portion of the seat portion as the backrest portion is inclined. Thus, the child reliably sits up on the seat portion when the backrest portion is uprighted, while the extension plate extends substantially flush with the seat portion under the feet of the child when the backrest portion is most inclined, whereby the safety of the child who lies on this apparatus can be further improved. Due to the association or linking of the extending operation of the extension plate with the inclination of the backrest portion, the operation for the child seat apparatus can be further simplified.

Further preferably, the holding mechanism comprises first and third horizontally extending guide slots provided in the vicinity of upper and lower ends of the first major surface wall on the rear surface of the backrest portion respectively, second and fourth horizontally extending guide slots provided in the vicinity of upper and lower ends of the second major surface wall on the rear surface of the backrest portion respectively, first and third driving pins provided in the vicinity of upper and lower ends of the first major surface wall to be received in the first and third guide slots respectively so that the first major surface wall is movable along the first and third guide slots, and second and fourth driving pins provided in the vicinity of upper and lower ends of the second major surface wall to be received in the second and fourth guide slots so that the second major surface wall is movable along the second and fourth guide slots. Also, the interlocking mechanism preferably comprises a sliding plate, pivotally supporting the upper end of the bridging bar, which is vertically slidable at a substantially central portion on the rear surface of the backrest portion, first and second connecting pins provided on upper and lower ends of the sliding plate respectively, first and third connecting plates connecting the first and second connecting pins with the first and third driving pins to horizontally slide the first side guard following or linked to the vertical movement of the sliding plate, and second and fourth connecting plates connecting the first and second connecting pins with the second and fourth driving pins respectively to horizontally slide the second side guard following or linked to the vertical movement of the sliding plate.

According to this structure, the first to fourth connecting plates operate in response to the vertical movement of the sliding plate through movement of the upper end of the bridging bar whose position is changed in response to the inclination of the backrest portion, for horizontally sliding the first and second side guards. Thus, the space between the pair of side walls can be reliably changed by a simple mechanism.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS (First Embodiment)

The drawings illustrate a child seat apparatus according to a first embodiment of the present invention. The first embodiment is applied to a child chair 1, for example.

Figure 1:
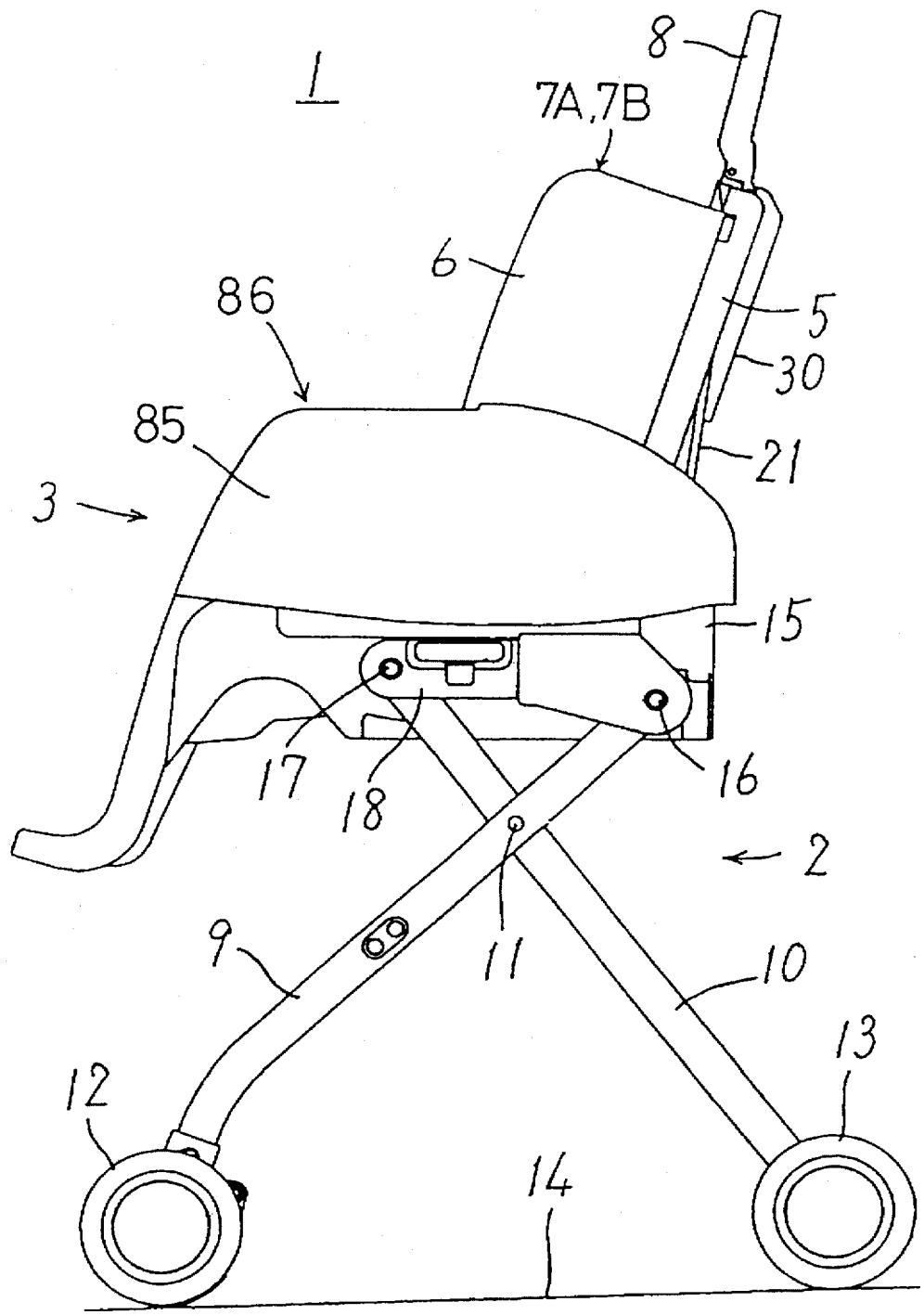
FIG. 1 is a side elevational view showing the appearance of a child chair 1 according to a first embodiment of the present invention, with a backrest portion 5 in a most uprighted state.
Figure 2:
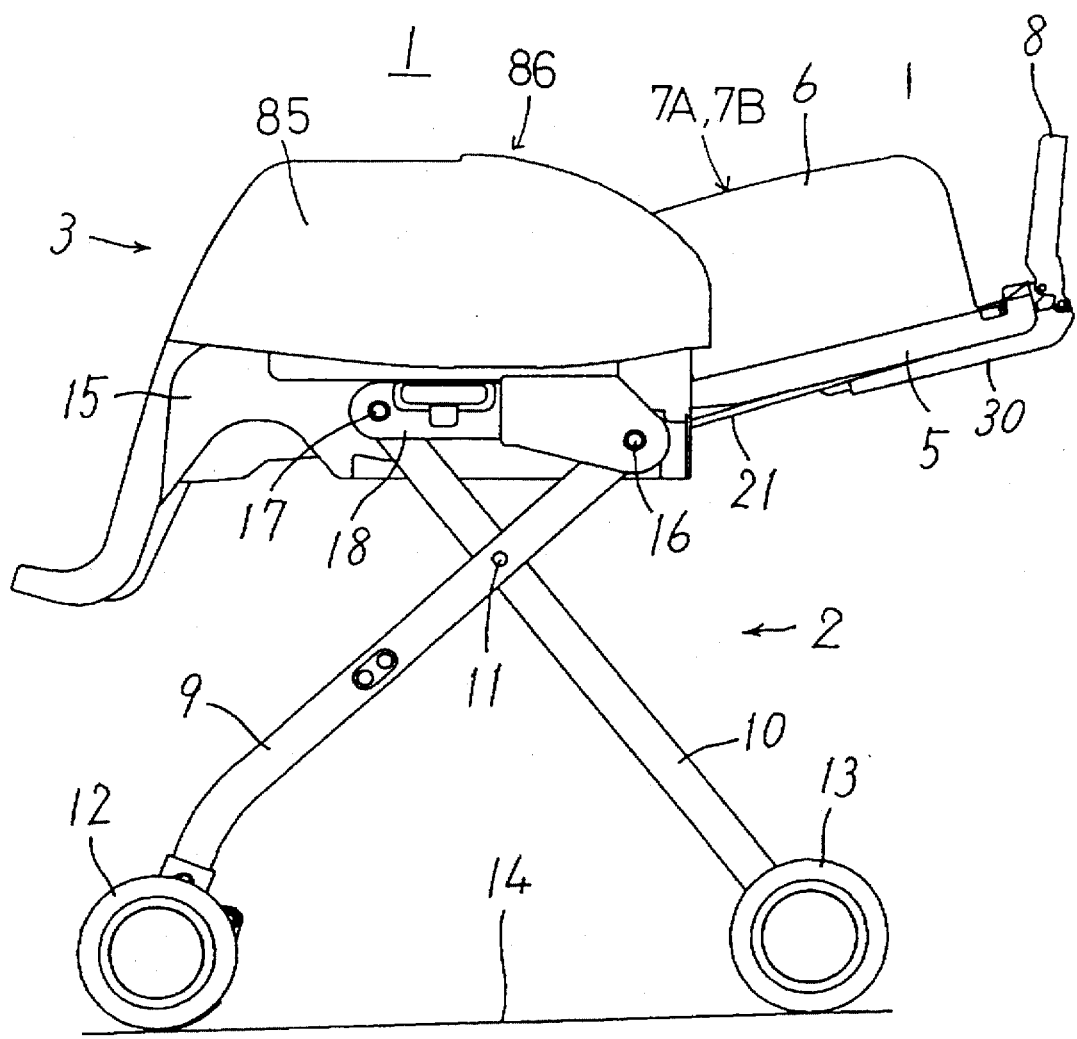
FIG. 2 is a side elevational view showing the appearance of the child chair 1 shown in FIG. 1, with the backrest portion 5 in a most inclined state.

FIGS. 1 and 2 are side elevational views showing the appearance of the overall child chair 1. The child chair 1 generally comprises a base part 2 and a seat part 3. The seat part 3 comprises a seat portion 4 (see FIG. 9 etc.) and a backrest portion 5 uprightly extending from the rear part of the seat portion 4. Further, a pair of armrest portions 86 are provided to define a pair of armrests 85 upwardly extending from both side edges of the seat portion 4 respectively. The backrest portion 5 is inclinable, as understood from FIGS. 1 and 2. In addition, first and second side guards 7A and 7B are provided in relation to or on the backrest portion 5, to define a pair of side walls 6A and 6B frontwardly extending from both side edges of the backrest portion 5 respectively. Further, a head guard 8 is lengthwisely rotatably mounted on an upper end of the backrest portion 5. The head guard 8 extends substantially flush with the backrest portion 5 when the backrest portion is in an ordinary upright state as shown in FIG. 1, while the head guard 8 is uprighted or angled to extend substantially perpendicularly from the backrest portion 5 as shown in FIG. 2, when the backrest portion 5 is in a most inclined state.

On the other hand, the base part 2 comprises front and rear legs 9 and 10. These front and rear legs 9 and 10 intersect with each other, and are coupled with each other by pivot portions 11 at the intersections. Front and rear wheels 12 and 13 are rotatably mounted on lower ends of the front and rear legs 9 and 10 respectively. The front and rear wheels 12 and 13 can roll on a floor face 14, thereby moving the overall chair 1.

The seat part 3 is held by a seat holder 15, which in turn is supported by the front and rear legs 9 and 10. The front and rear legs 9 and 10 are rotatably mounted on the seat holder 15 through pivot portions 16 and 17 respectively. The pivot portions 17 are positioned on movable parts 18 which are provided on the seat holder 15. The movable parts 18 can be adjusted to change the positions thereof along the lengthwise direction of the chair 1, thereby changing the angles of the front and rear legs 9 and 10. Thus, the height of the seat part 3 can be adjusted. The mechanism for changing the positions of the movable parts 18 is not related to the subject matter of the present invention, and hence a detailed description thereof is omitted.

Figure 3:
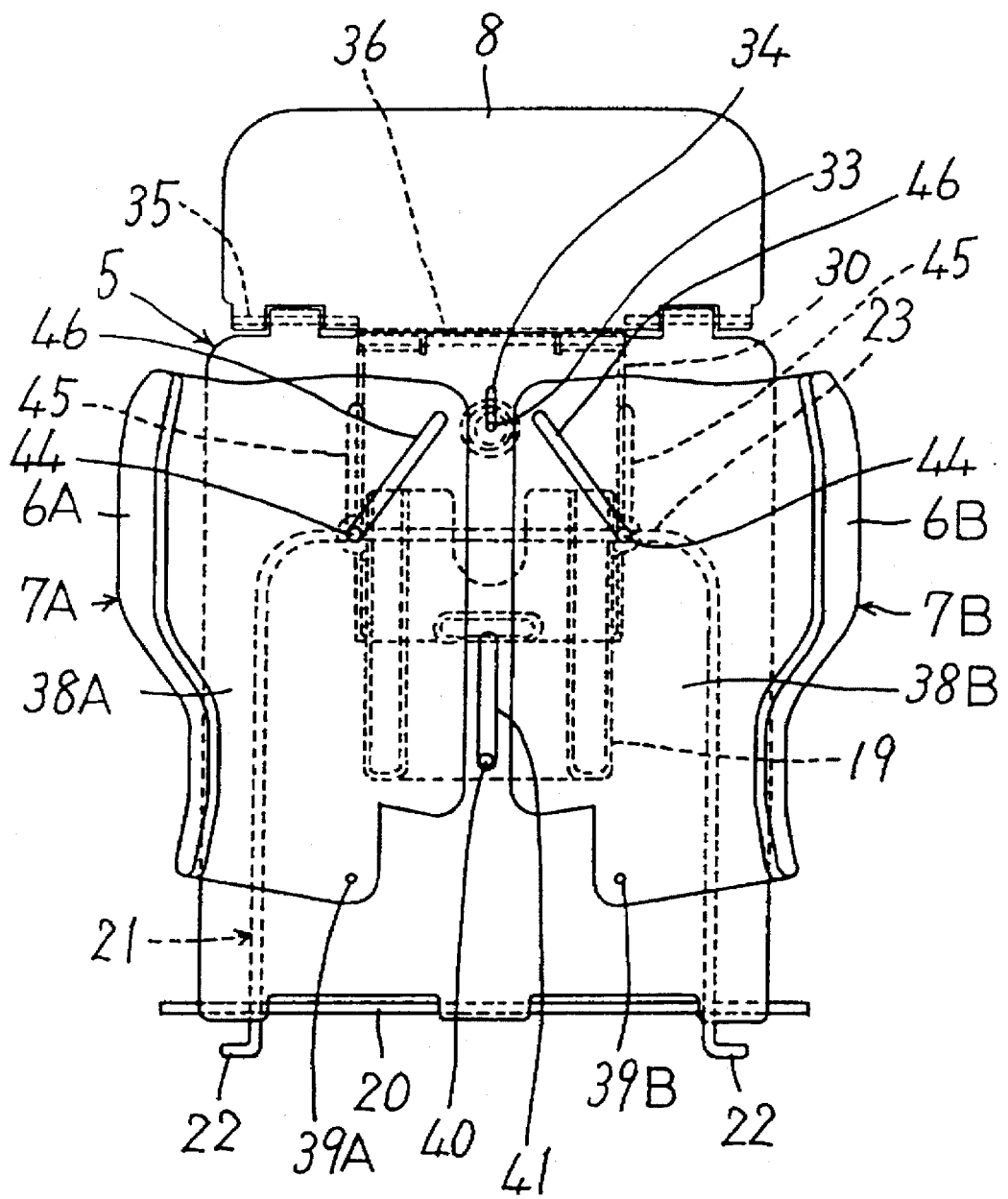
FIG. 3 is a front elevational view of the backrest portion 5 in the upright state shown in FIG. 1.
Figure 4:
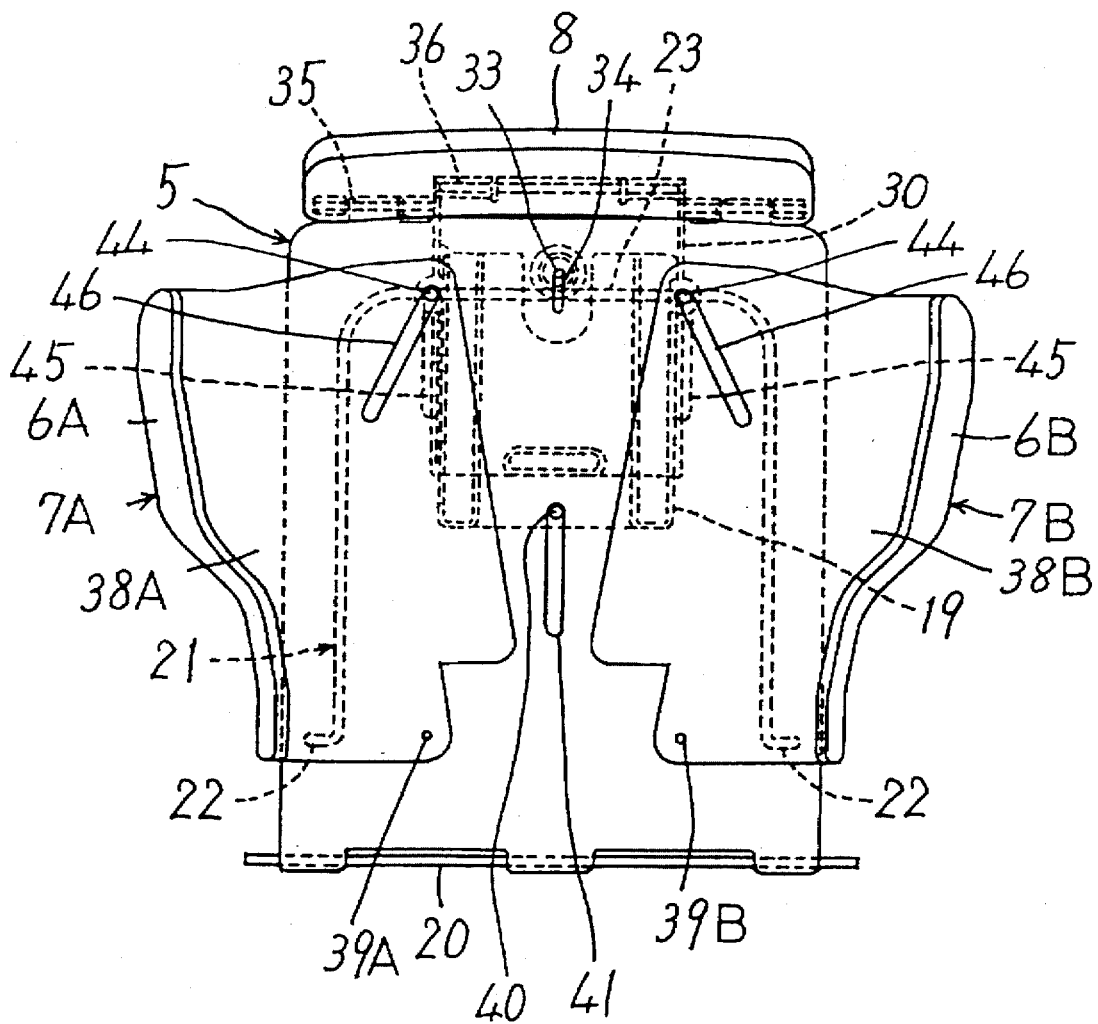
FIG. 4 is a front elevational view of the backrest portion 5 in the inclined state shown in FIG. 2.
Figure 5:
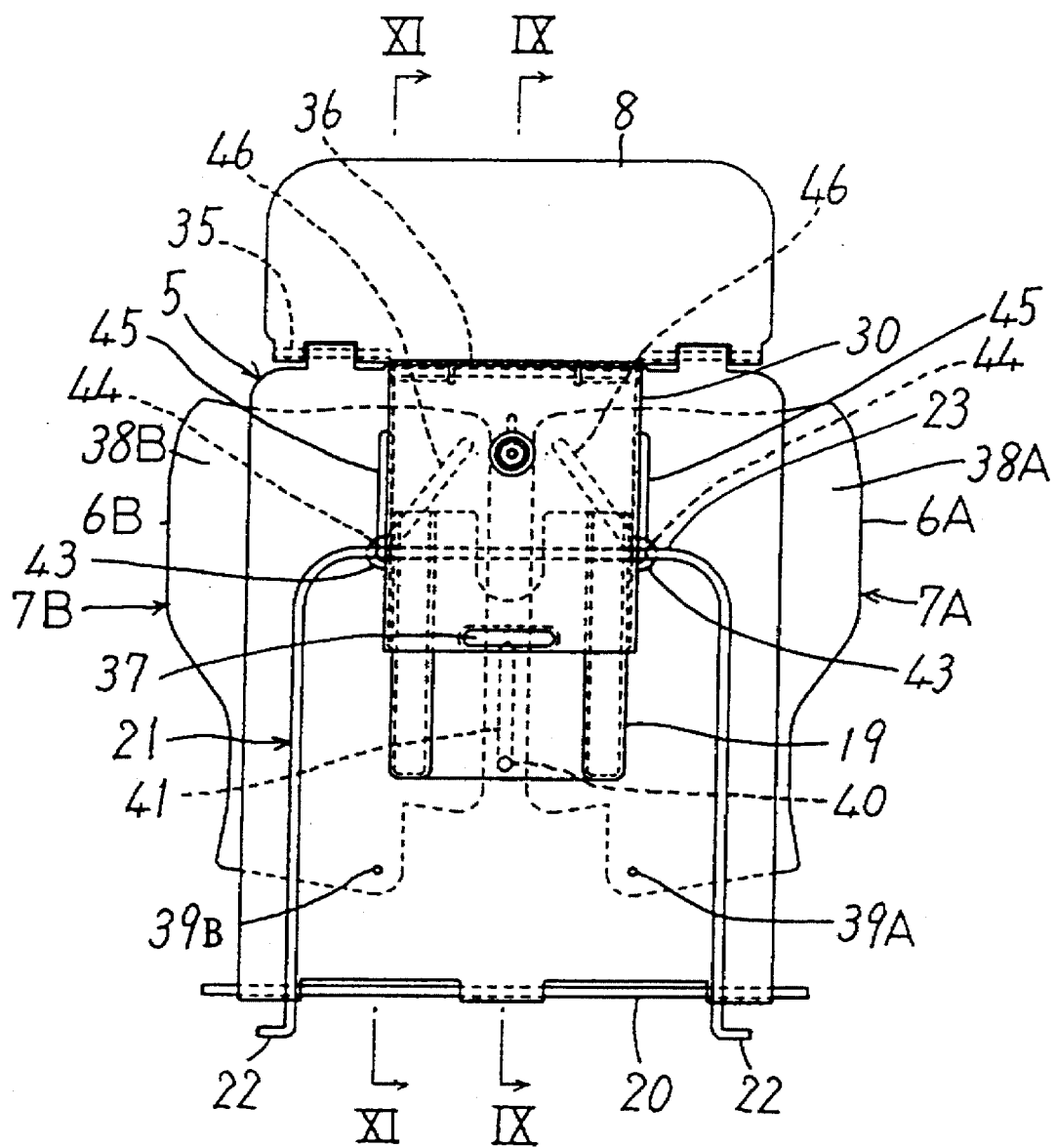
FIG. 5 is a rear elevational view of the backrest portion 5 in the upright state shown in FIG. 1.
Figure 6:
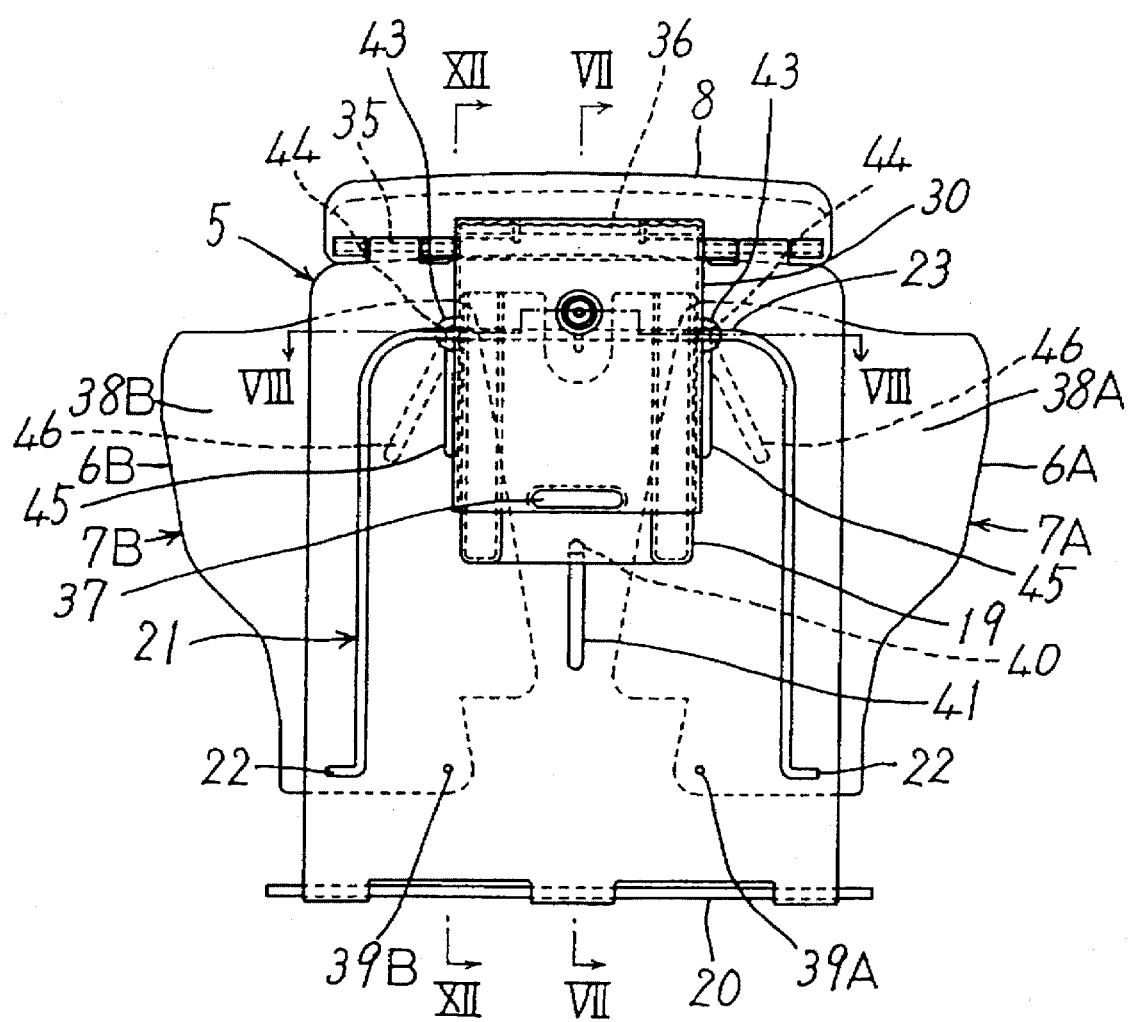
FIG. 6 is a rear elevational view of the backrest portion 5 in the inclined state shown in FIG. 2.
Figure 7:
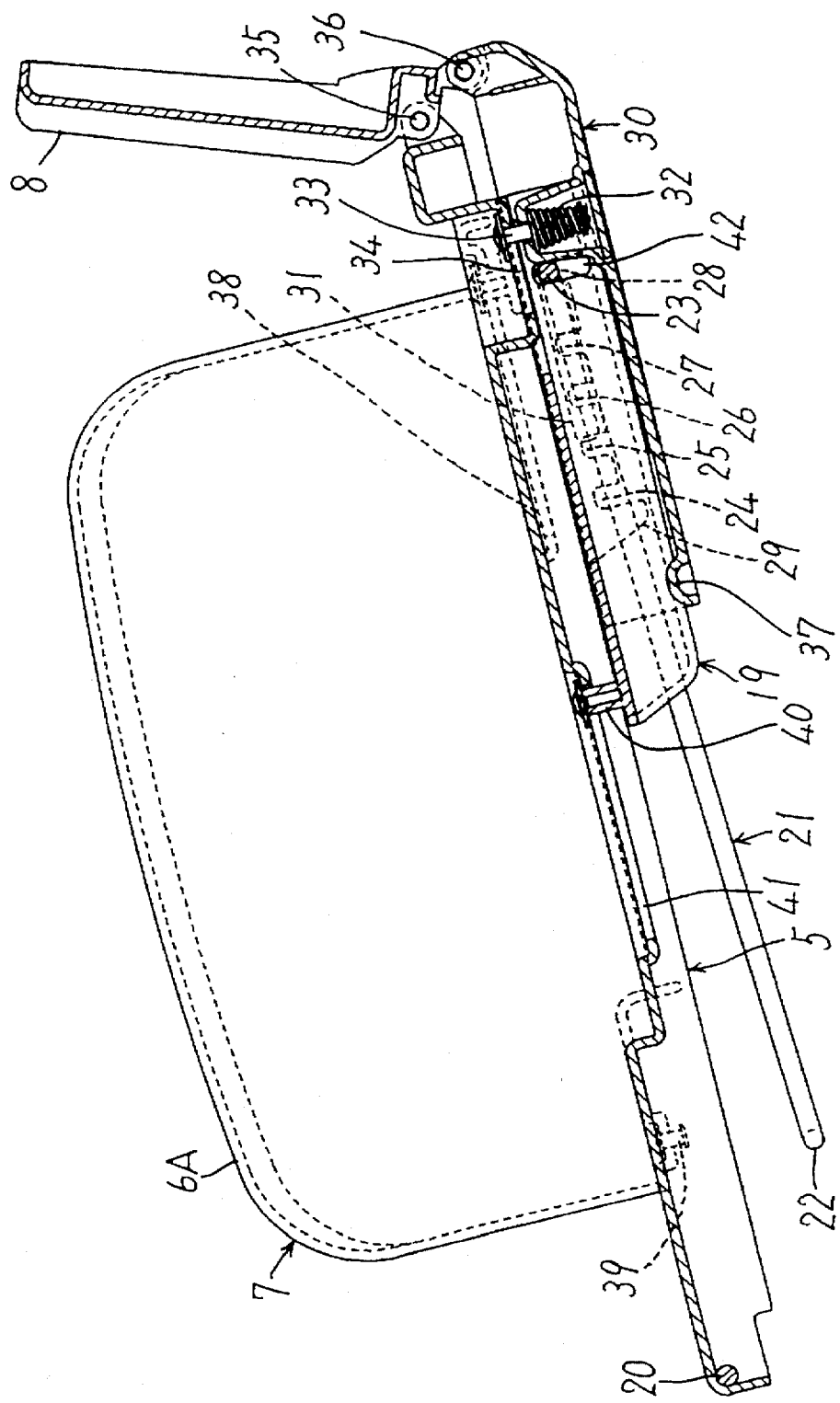
FIG. 7 is an enlarged sectional view taken along the line VII—VII in FIG. 6.
Figure 8:
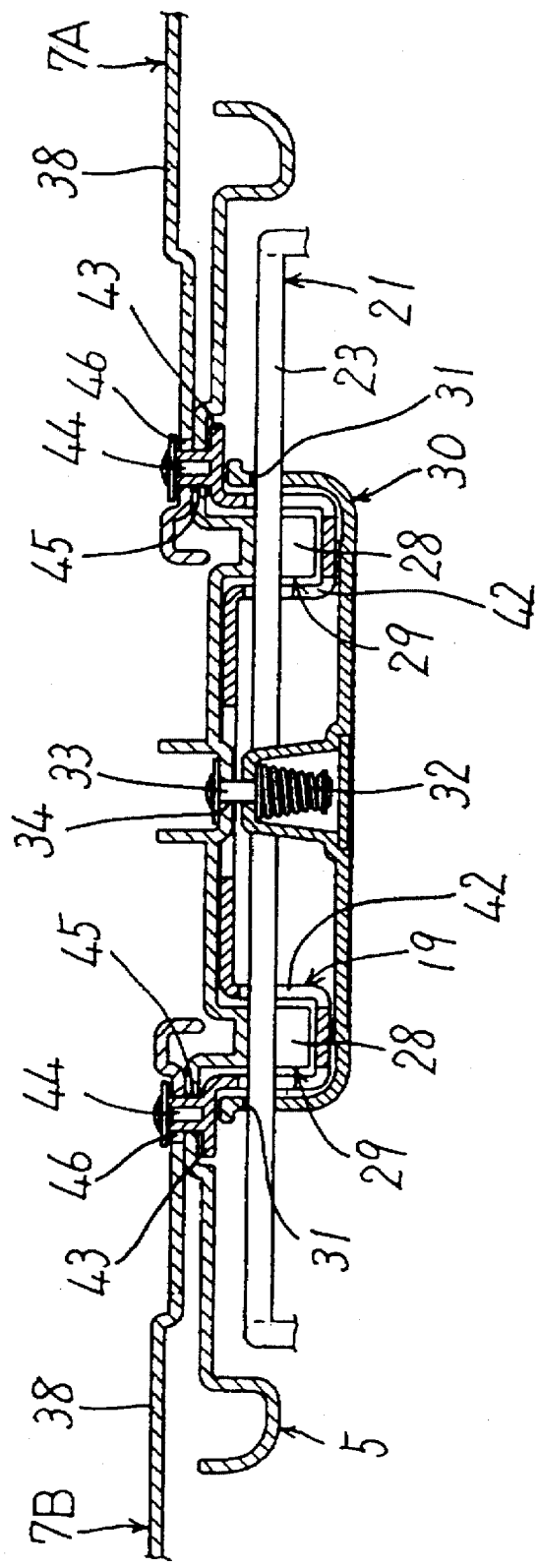
FIG. 8 is an enlarged sectional view taken along the line VIII—VIII in FIG. 6.
Figure 9:
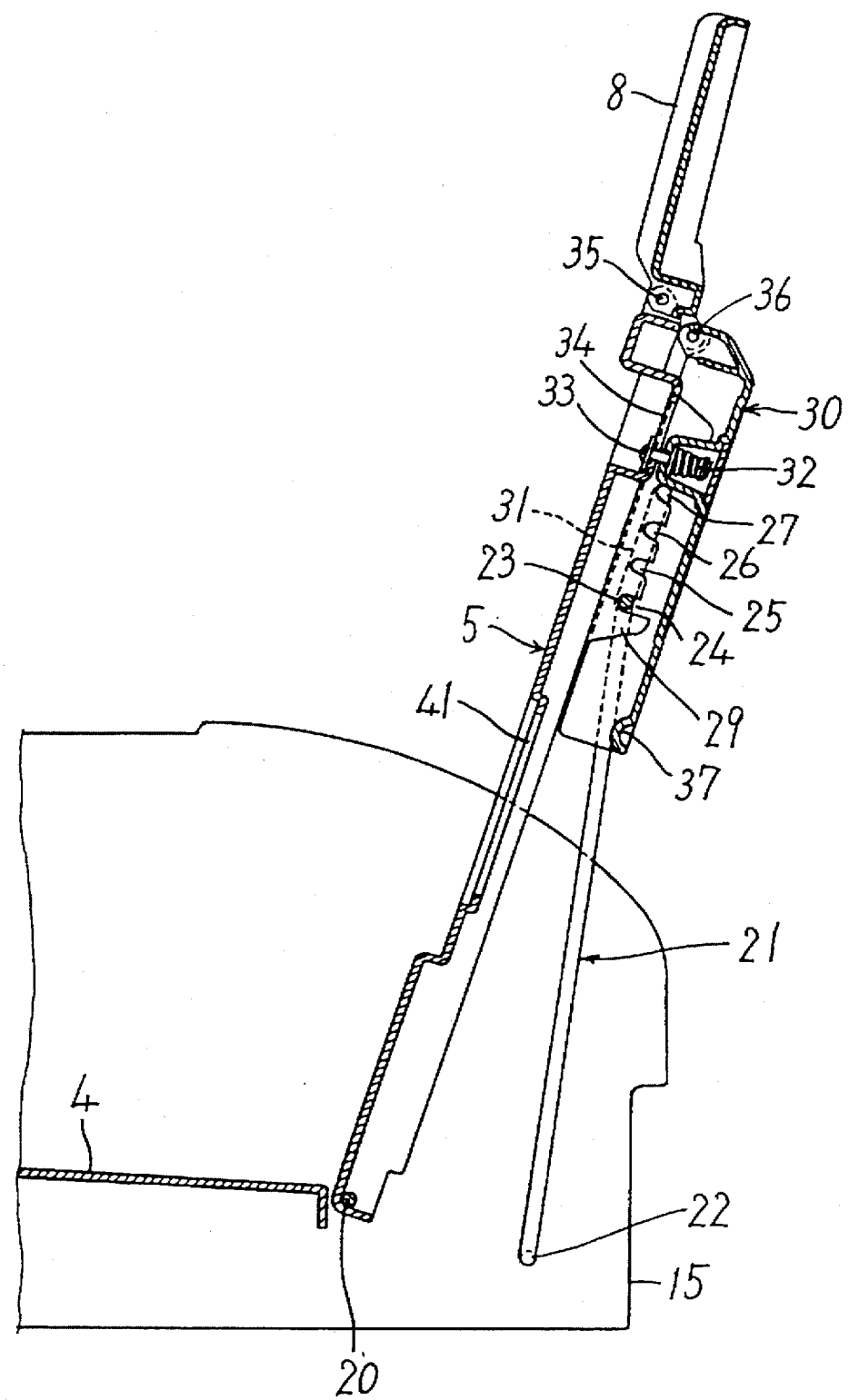
FIG. 9 is a sectional view taken along the line IX—IX in FIG. 5, while omitting the side guards 7A and 7B etc. for the sake of clarity.
Figure 10:
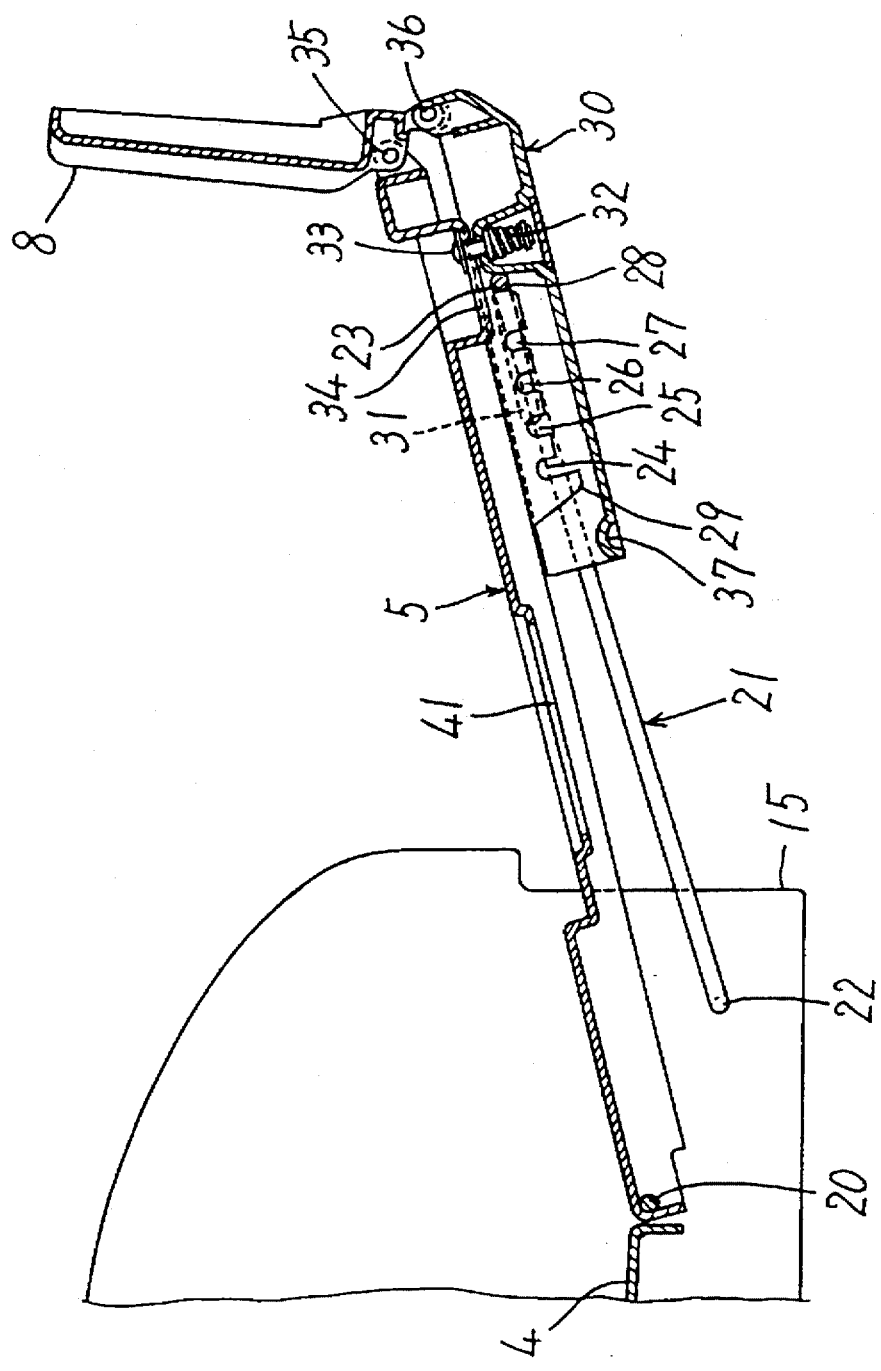
FIG. 10 is a sectional view taken along the line VII—VII in FIG. 6 and generally corresponds to FIG. 7 on a different scale.
Figure 11:
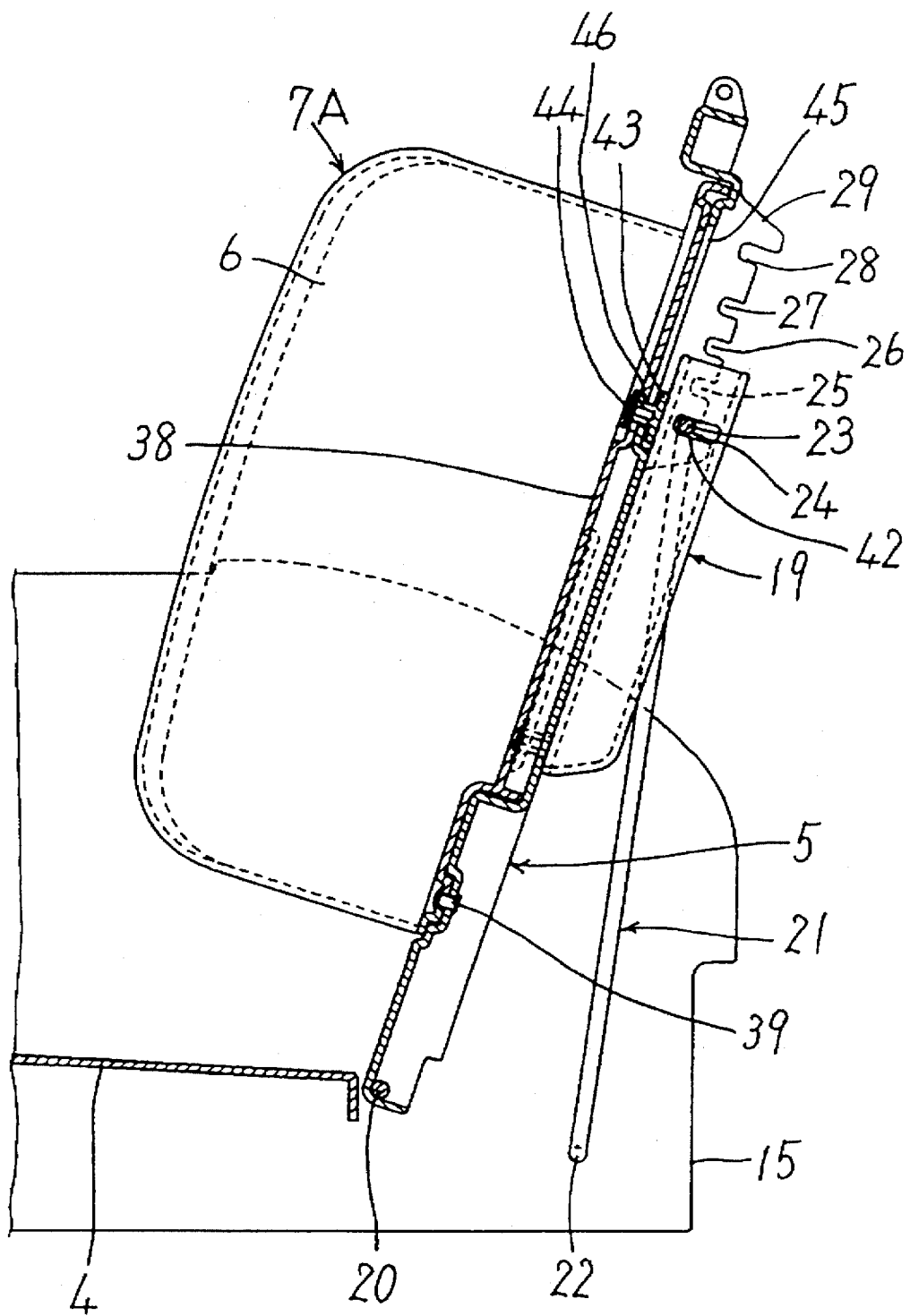
FIG. 11 is a sectional view taken along the line XI—XI in FIG. 5, while omitting an operating member 30 etc. for the sake of clarity.
Figure 12:
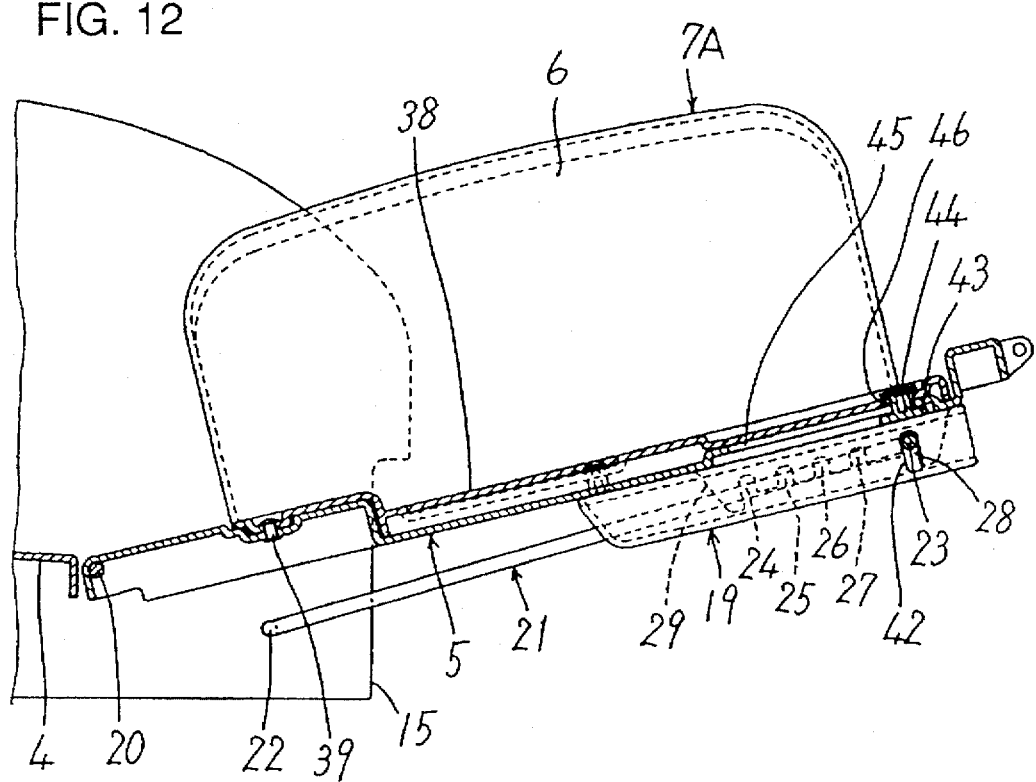
FIG. 12 is a sectional view taken along the line XII—XII in FIG. 6.
Figure 13:
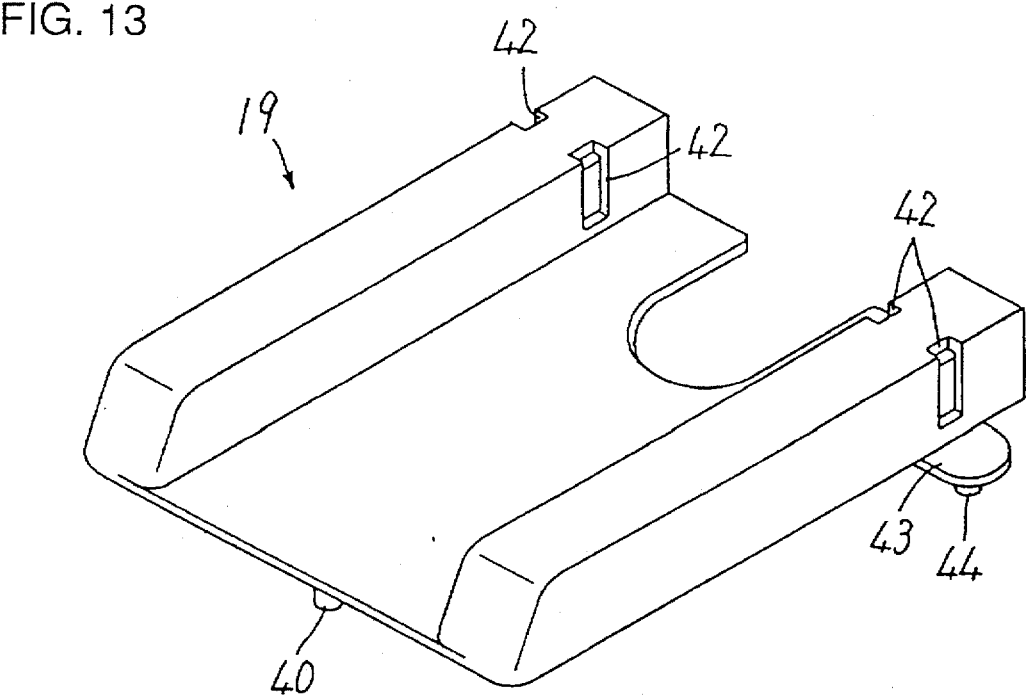
FIG. 13 is a perspective view independently showing a slider 19 shown in FIG. 11.

The feature of this embodiment is related to the backrest portion 5. FIGS. 3 to 13 show structures which are related to the backrest portion 5 respectively. FIGS. 3 and 4 are front elevational views illustrating the backrest portion 5 in states corresponding to those shown in FIGS. 1 and 2 respectively. FIGS. 5 and 6 are rear elevational views illustrating the backrest portion 5 in the states corresponding to those shown in FIGS. 1 and 2 respectively. FIGS. 7 and 8 are sectional views taken along lines VII—VII and VIII—VIII in FIG. 6 respectively. FIGS. 9 and 10, which illustrate an inclination mechanism for the backrest portion 5, are sectional views taken along the lines IX—IX and VII—VII in FIGS. 5 and 6 respectively. FIGS. 11 and 12, illustrating a mechanism for driving the side guard 7A, are sectional views taken along the lines XI—XI and XII—XII in FIGS. 5 and 6 respectively. FIG. 13 is a perspective view independently illustrating a slider 19 shown in FIGS. 11 and 12.

Mainly with reference to FIGS. 9 and 10, the inclination mechanism for the backrest portion 5 is now described.

The backrest portion 5 is rotatably supported with respect to the seat holder 15 through a shaft 20, so as to be inclinable. An inverted U-shaped bridging bar 21 is provided in order to fix the backrest portion 5 in an adjusted inclined state. A lower end 22 of the bridging bar 21 is rotatably mounted on the seat holder 15 in a position or location different from that of the shaft 20. On the other hand, an upper end 23 of the bridging bar 21 is selectively fixed to any one of a plurality of positions which are vertically distributed on the rear surface of the backrest portion 5. For example, in order to fix the upper end 23, an engaging member 29 having a plurality of engaging cavities 24, 25, 26, 27 and 28 for selectively engaging with the upper end 23 is provided on the rear surface of the backrest portion 5. In the state shown in FIG. 9, the upper end 23 engages with the lowermost engaging cavity 24, thereby most uprighting the backrest portion 5. In the state shown in FIG. 10, on the other hand, the upper end 23 engages with the uppermost engaging cavity 28, thereby most inclining the backrest portion 5.

An operation member 30 is provided in order to stably maintain the upper end 23 in a state engaging with any one of the engaging cavities 24 to 28 as described above and to bring the upper end 23 into a disengaged state, i.e. engaging with none of the engaging cavities 24 to 28. The operation member 30 has a slot 31 receiving the upper end 23 of the bridging bar 21, so that the upper end 23 is movable in the slot 31 along its longitudinal direction.

The operation member 30 is regularly urged by a compression spring 32 toward the backrest portion 5. An end of the compression spring 32 engages with an end of a thrust pin 33, while the other end thereof is in contact with the operation member 30. Another end of the thrust pin 33 passes through the operation member 30 and extends toward the front surface of the backrest portion 5, to engage with the backrest portion 5. The thrust pin 33 is movable in a slot 34, which is provided in the backrest portion 5, along its longitudinal direction. Therefore, the operation member 30 is also displaceable with respect to the backrest portion 5 along the longitudinal direction of the slot 34 within the range of its extension. The operation member 30 can be separated or pulled slightly away from the backrest portion 5 against the elasticity of the compression spring 32.

The aforementioned head guard 8 is lengthwisely rotatably mounted on the upper end of the backrest portion 5 through a shaft 35. The head guard 8 and the operation member 30 are rotatably coupled with each other through a shaft 36. Due to this structure, the operation of the upper end 23 of the bridging bar 21 is transmitted to the head guard 8 through the operation member 30 via the slot 31 when the backrest portion 5 is most inclined, so that the head guard 8 is uprighted from the backrest portion 5 as shown in FIG. 10.

On the basis of the aforementioned structure, inclination of the backrest portion 5 is now described.

In the state shown in FIG. 9, the backrest portion 5 is most uprighted and this state is supported by the upper end 23 of the bridging bar 21 engaging with the lowermost engaging cavity 24 of the engaging member 29. The state of such engagement of the upper end 23 and the engaging cavity 24 is maintained by the operation member 30 which is urged by the compression spring 32 toward the backrest portion 5. As understood from the position of the thrust pin 33 in the slot 34, the operation member 30 is in a relatively lower position with respect to the backrest portion 5, whereby the head guard 8 extends substantially flush with the backrest portion 5.

In order to incline the backrest portion 5 from the aforementioned state, the operation member 30 is first separated or tiltingly pulled away from the backrest portion 5. This operation is achieved by manually pulling with one's finger engaging an operation rib 37 which is provided on a lower end of the operation member 30 to project inwardly. Due to this operation, the operation member 30 is rotated about the shaft 36 against the elasticity of the compression spring 32. Therefore, the upper end 23 of the bridging bar 21 disengages from the engaging cavity 24 due to the tilting motion of the operation member 30 imparted to the upper end 23 via the slot 31. Thus, the backrest portion 5 can be inclined.

After the backrest portion 5 is inclined to an arbitrary angle as desired, the pulling or rotating force that had been applied to the operation member 30 is removed. Thus, the operation member 30 is urged by the compression spring 32 and rotated toward the backrest portion 5 so that the upper end 23 of the bridging bar 21 engages with any desired one of the engaging cavities 25 to 28.

When the operation member 30 is in the position shown in FIG. 9, engagement of the upper end 23 of the bridging bar 21 and any one of the engaging cavities 24 to 27 can be attained in the range of extension of the slot 31. Also when the upper end 23 having previously been engaged with the engaging cavity 24 now engages with any one of the engaging cavities 25 to 27, therefore, the position of the operation member 30 with respect to the backrest portion 5 remains unchanged, whereby the positional relation between the head guard 8 and the backrest portion 5 is also retained. When the upper end 23 engages with the uppermost engaging cavity 28, on the other hand, it exceeds the range of the slot 31 of the operation member 30 in the position shown in FIG. 9. Therefore, the upper end 23 which is positioned at an end of the slot 31 upwardly displaces the operation member 30 with respect to the backrest portion 5. FIG. 10 shows such a state that the upper end 23 engages with the uppermost engaging cavity 28 while upwardly displacing the operation member 30, as understood from the position of the thrust pin 33 in the slot 34.

In the state shown in FIG. 10, the backrest portion 5 is most inclined and the head guard 8 is uprighted from the backrest portion 5.

In order to upright the backrest portion 5 from the state shown in FIG. 10 to that shown in FIG. 9 or to an intermediate state, an operation substantially similar to the above is carried out. As understood from the range of extension of the slot 31, the head guard 8 extends substantially flush with the backrest portion 5 when the upper end 23 engages with the engaging cavity 24 as shown in FIG. 9, while the same is maintained in the position uprighted from the backrest portion 5 before reaching this state, as shown in FIG. 10. In order to make the head guard 8 extend substantially flush with the backrest portion 5 as shown in FIG. 9 in such an intermediate state, therefore, force is directly applied to the head guard 8 to forcibly rotate the same. Alternatively, the same effect can be achieved without directly manipulating the head guard 8 by temporarily moving the backrest portion 5 to the state shown in FIG. 9 and thereafter again inclining the backrest portion 5 to the desired inclination angle.

The space between the aforementioned pair of side walls 6A and 6B is changed in association with such inclination of the backrest portion 5. More specifically, the aforementioned space is widened as the backrest portion 5 is inclined. This structure is now described with reference to FIGS. 3 to 8 and 11 to 13. The pair of first and second side guards 7A and 7B comprise first and second major surface walls 38A and 38B extending along the front surface of the backrest portion 5 for positioning the side walls 6A and 6B on outer ends respectively. In order to hold the first and second side guards 7A and 7B so that the space between the pair of side walls 6A and 6B is changeable, lower ends of the first and second major surface walls 38A and 38B are rotatably supported with respect to the backrest portion 5 through pivot pins 39A and 39B respectively. The operation of the upper end 23 of the bridging bar 21 is transmitted to the first and second side guards 7A and 7B, so that the space between the pair of side walls 6A and 6B is changed in association with inclination of the backrest portion 5. The structure therefor is now described. As clearly shown in FIGS. 5, 6, 7 and 8, the aforementioned operation member 30 is in the form of a box, with a slider 19 positioned inside the same. The slider 19 is provided with a guide post 40, which is received in a longitudinal guide hole 41 provided in the backrest portion 5 to extend in the vertical direction. Therefore, the slider 19 is slidable with respect to the backrest portion 5 by the range of the guide post 40 which is movable in the guide hole 41. The slider 19 is further provided with a through hole 42 receiving the upper end 23 of the bridging bar 21. The longitudinal direction of the through hole 42 is perpendicular to the plane of extension of the backrest portion 5, to allow the aforementioned engagement and disengagement of the upper end 23 with and from the engaging cavities 24 to 28. Thus, the upper end 23 is so received in the through hole 42 that the slider 19 is vertically displaced along the rear surface of the backrest portion 5 following the motion of the upper end 23.

A pair of brackets 43 are provided to extend from both sides of the slider 19, and a pair of driving pins 44 are provided on these brackets 43. The backrest portion 5 is provided with a pair of guide slots 45 extending in parallel with each other, which receive the pair of driving pins 44 to be vertically movable respectively therein. The pair of driving pins 44 pass through the pair of guide slots 45, to reach the first and second major surface walls 38A and 38B of the first and second side guards 7A and 7B respectively. The first and second major surface walls 38A and 38B of the first and second side guards 7A and 7B are provided with a pair of driven slots 46 for receiving the pair of driving pins 44 to be longitudinally movable respectively therein. As clearly shown in FIGS. 3 and 4, the pair of driven slots 46 are so directed or inclined relative to each other so as to approach toward each other toward upper ends thereof.

As hereinabove described, the upper end 23 of the bridging bar 21 vertically moves along the rear surface of the backrest portion 5 in response to the change of its inclination, and the slider 19 is vertically slid along the rear surface of the backrest portion 5 following such movement of the upper end 23. In response to such sliding of the slider 19, the driving pins 44 vertically move in the guide slots 45 provided in the backrest portion 5. During the movement in the guide slots 45, the driving pins 44 engage with the driven slots 46 provided in the first and second side guards 7A and 7B and thereby rotate the side guards about the pivot pins 39A and 39B.

The backrest portion 5 is most uprighted in the state shown in FIGS. 3 and 5, so that the driving pins 44 are positioned on the lower ends of the guide slots 45 as well as on the lower ends of the driven slots 46. Thus, the first and second side guards 7A and 7B are rotated most closely toward each other, thereby minimizing the space between the side walls 6A and 6B.

On the other hand, the backrest portion 5 is most inclined in the state shown in FIGS. 4 and 6, so that the driving pins 44 are positioned on the upper ends of the guide slots 45 as well as the upper ends of the driven slots 46. Thus, the first and second side guards 7A and 7B most separate from each other, thereby maximizing the space between the side walls 6A and 6B.

When the driving pins 44 are positioned in longitudinal centers of the guide slots 45 and the driven slots 46, the first and second side guards 7A and 7B are rotated to be in intermediate positions between those in the states shown in FIGS. 3 and 5 and FIGS. 4 and 6, so that the space between the pair of side walls 6A and 6B is also in an intermediate state.

Thus, the space between the pair of side walls 6A and 6B can be changed to be widened as the backrest portion 5 is inclined, in association with the inclination of the backrest portion 5.

In the first embodiment shown in FIGS. 1 to 13, the head guard 8 is so provided that its angle is controlled by the operation of the upper end 23 of the bridging bar 21, while this structure is not required for the present invention. The head guard 8 may alternatively be so arranged that its angle can be changed by a direct manual operation or is unchangeable. Further, the inventive child seat apparatus may be provided with no head guard.

(Second Embodiment)

A child seat apparatus according to a second embodiment of the present invention is now described. Comparing the child seat apparatus according to the second embodiment with that according to the first embodiment, first and second side guards 52 and 53 are supported to be translated with respect to a backrest portion 51 according to the structure of the second embodiment, although the first and second side guards are rotatably supported with respect to the backrest portion in the structure of the first embodiment. Therefore, the translated structures of the first and second side guards 52 and 53 are now described in detail with reference to FIGS. 14 to 22.

Figure 14:
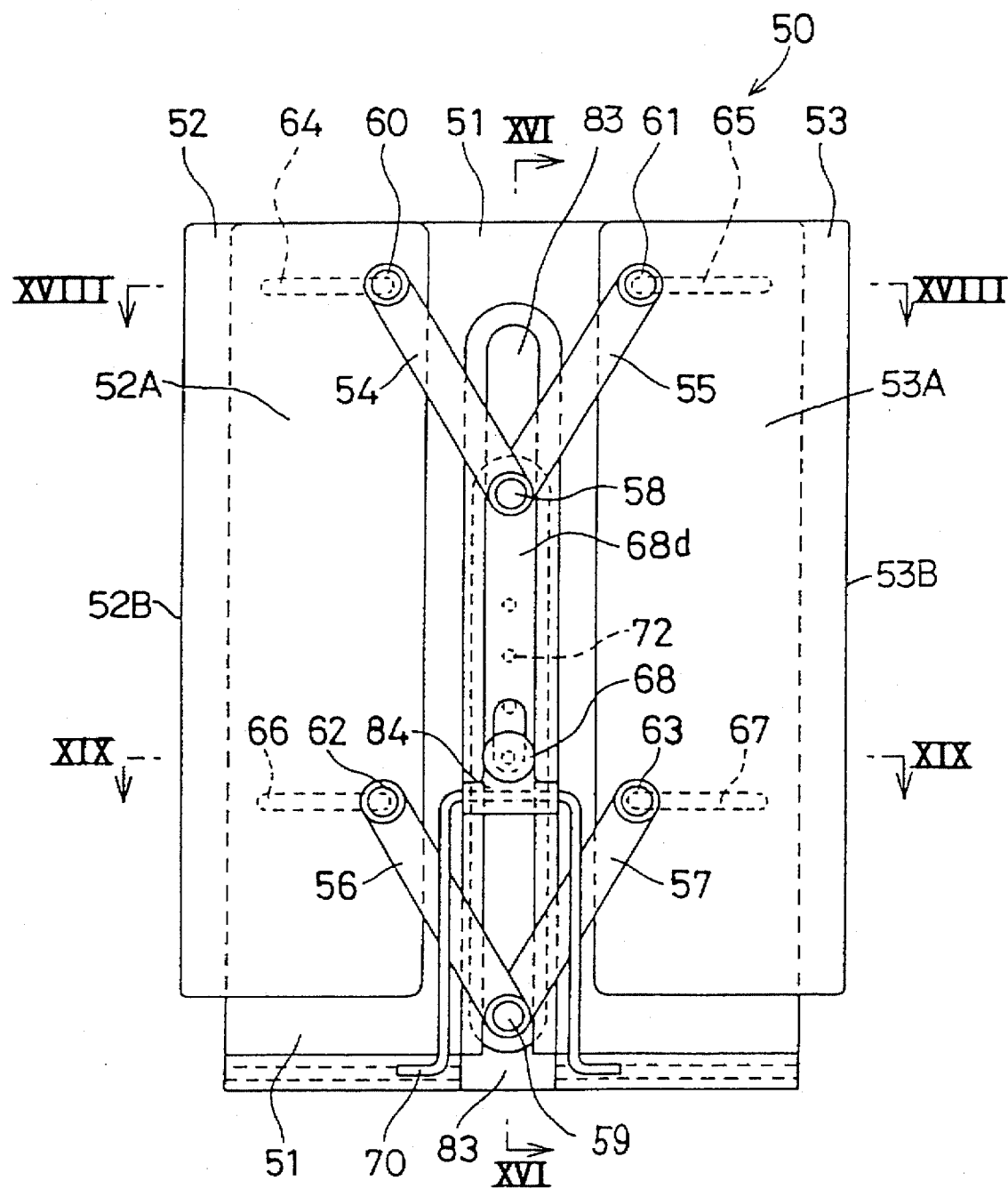
FIG. 14 is a first diagram showing the structure of a backrest portion in a second embodiment according to the present invention.
Figure 15:
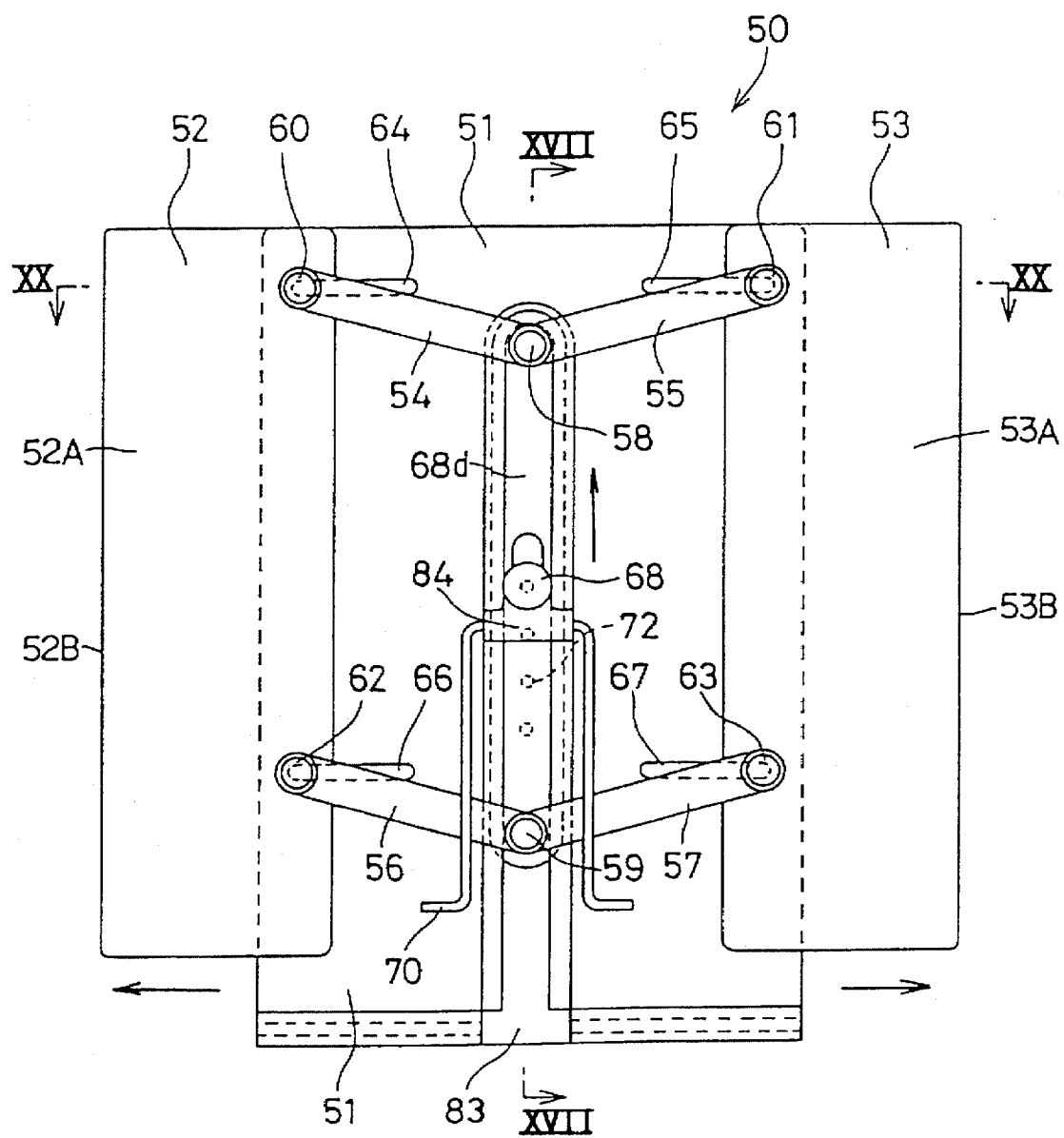
FIG. 15 is a second diagram showing the structure of the backrest portion in the second embodiment according to the present invention.
Figure 16:
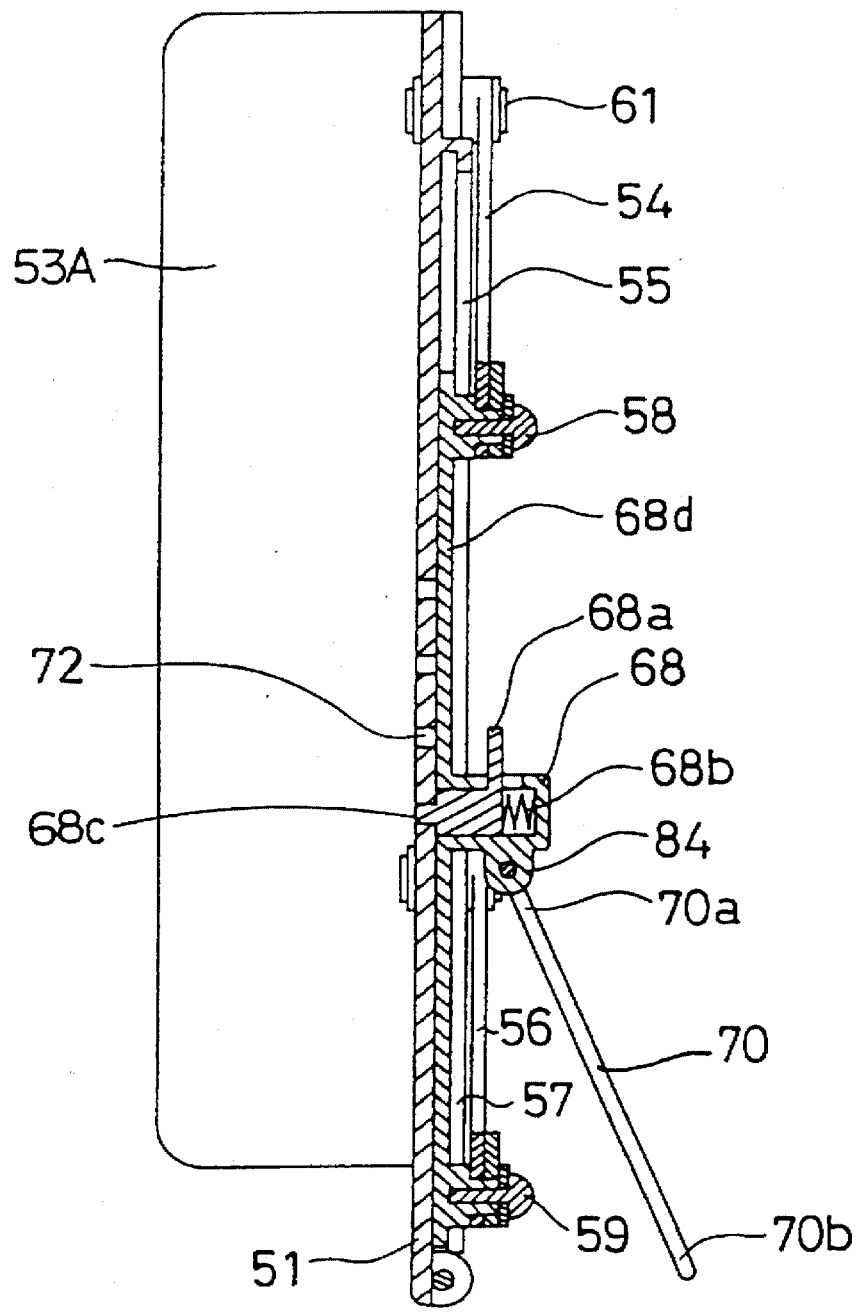
FIG. 16 is a sectional view taken along the line XVI—XVI in FIG. 14.

FIGS. 14 and 15 are rear elevational views of the backrest portion 51, showing the first and second side guards 52 and 53 in relative positions that are most narrowed and most widened respectively. FIGS. 16, 17, 18, 19 and 20 are sectional views taken along the lines XVI—XVI in FIG. 14, XVII—XVII in FIG. 15, XVIII—XVIII in FIG. 14, XIX—XIX in FIG. 14 and XX—XX in FIG. 15 respectively.

With reference to FIGS. 14, 16, 18 and 19, the structure of the backrest portion 51 in this embodiment is now described.

The first and second side guards 52 and 53 are provided with first and second major surface walls 52A and 53A extending along the backrest portion 51 for positioning first and second side walls 52B and 53B on outer side edges respectively.

First and third horizontally extending guide slots 64 and 66 are provided in the vicinity of upper and lower ends of the first major surface wall 52A on the rear surface of the backrest portion 51 respectively. Further, second and fourth horizontally extending guide slots 65 and 67 are provided in the vicinity of upper and lower ends of the second major surface wall 53A on the rear surface of the backrest portion 51 respectively.

First, third, second and fourth driving pins 60, 62, 61 and 63 are provided in positions of the first and second major surface walls 52A and 53A corresponding to positions of the first to fourth guide slots 64 to 67 and are received in the first, third, second and fourth guide slots 64, 66, 65 and 67 respectively so that the first and second major surface walls 52A and 53A are horizontally movable along the first to fourth guide slots 64 to 67.

In an interlocking mechanism for association with an inclination mechanism, a vertically extending guide groove 83 is provided on the rear surface of the backrest portion 51, and a slider 68 is provided to be vertically movably guided by this guide groove 83. This slider 68 is provided with a stopper pin 68a for positioning a sliding plate 68d and the slider 68, and a spring 68b for applying an urging force to the stopper pin 68a.

A projection 68c which is provided on the forward end of the stopper pin 68a is inserted in a selected one of plural positioning holes 72 provided in the backrest portion 51, thereby positioning the slider 68. The slider 68 rotatably supports an upper end 70a of a bridging bar 70 at a bridging bar fixing portion 84.

First and second connecting pins 58 and 59 are provided on upper and lower ends of the sliding plate 68d respectively. First and second connecting plates 54 and 55 which are connected with the first and second driving pins 60 and 61 respectively are mounted on the first connecting pin 58. On the other hand, third and fourth connecting plates 56 and 57 which are connected with the third and fourth driving pins 62 and 63 respectively are mounted on the second connecting pin 59.

Figure 17:
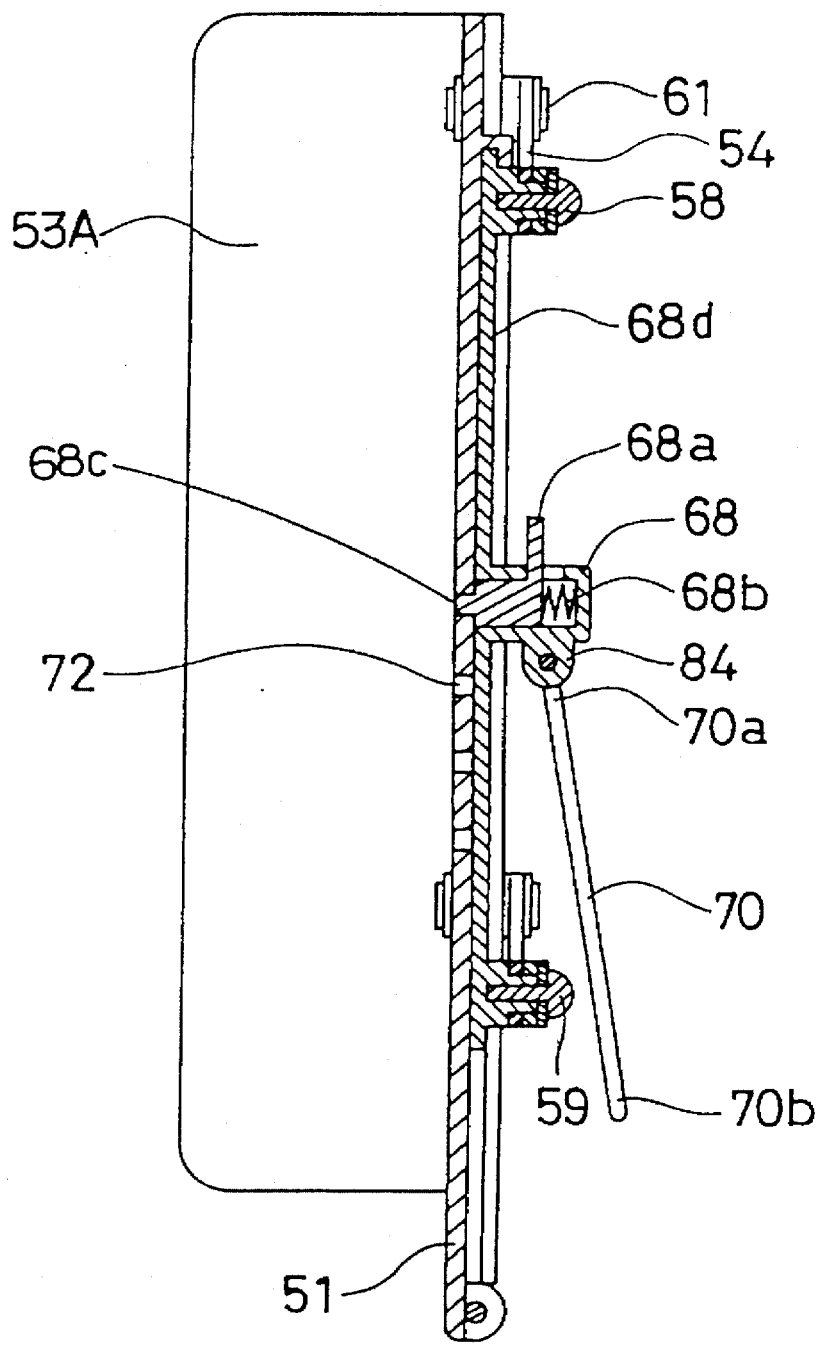
FIG. 17 is a sectional view taken along the line XVII—XVII in FIG. 15.
Figure 18:
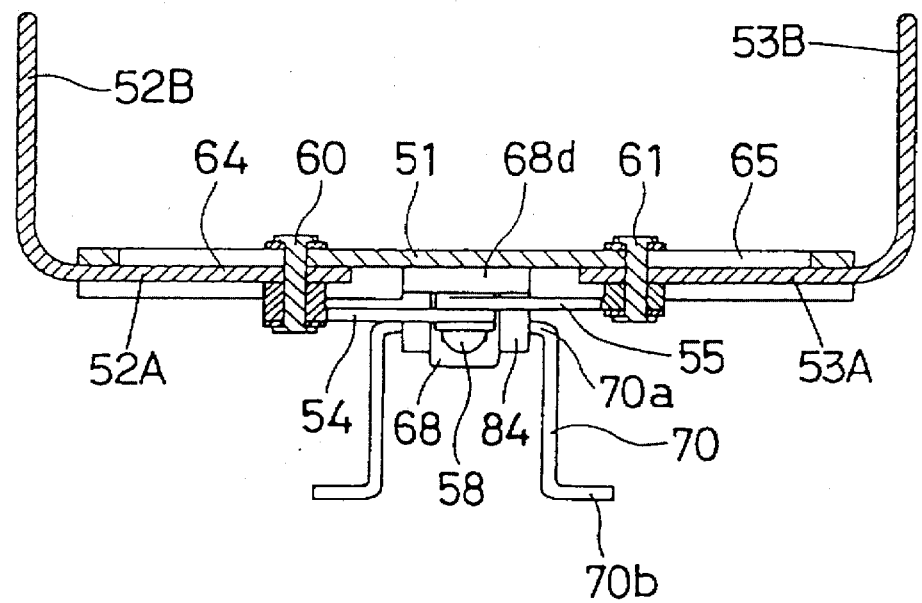
FIG. 18 is a sectional view taken along the line XVIII—XVIII in FIG. 14.
Figure 19:
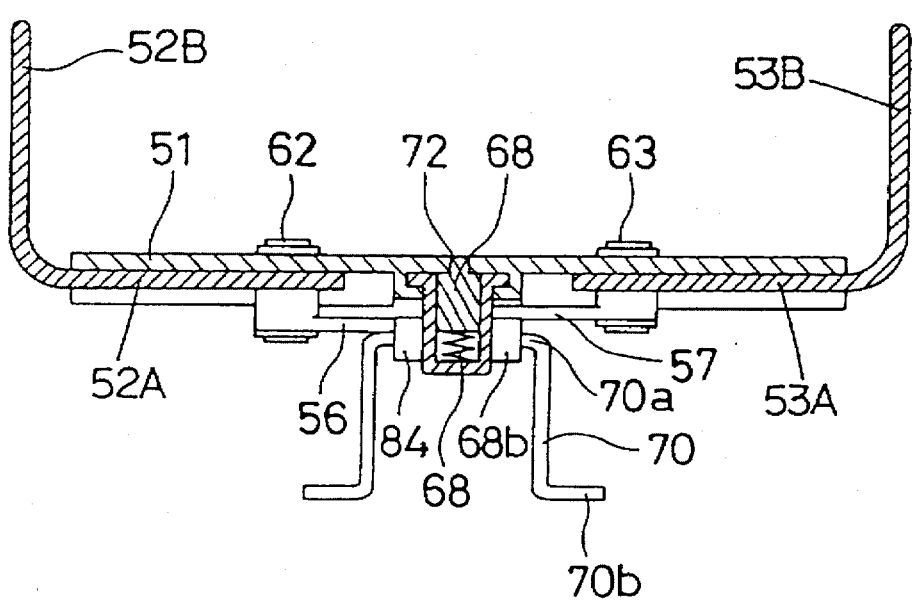
FIG. 19 is a sectional view taken along the line XIX—XIX in FIG. 14.
Figure 20:
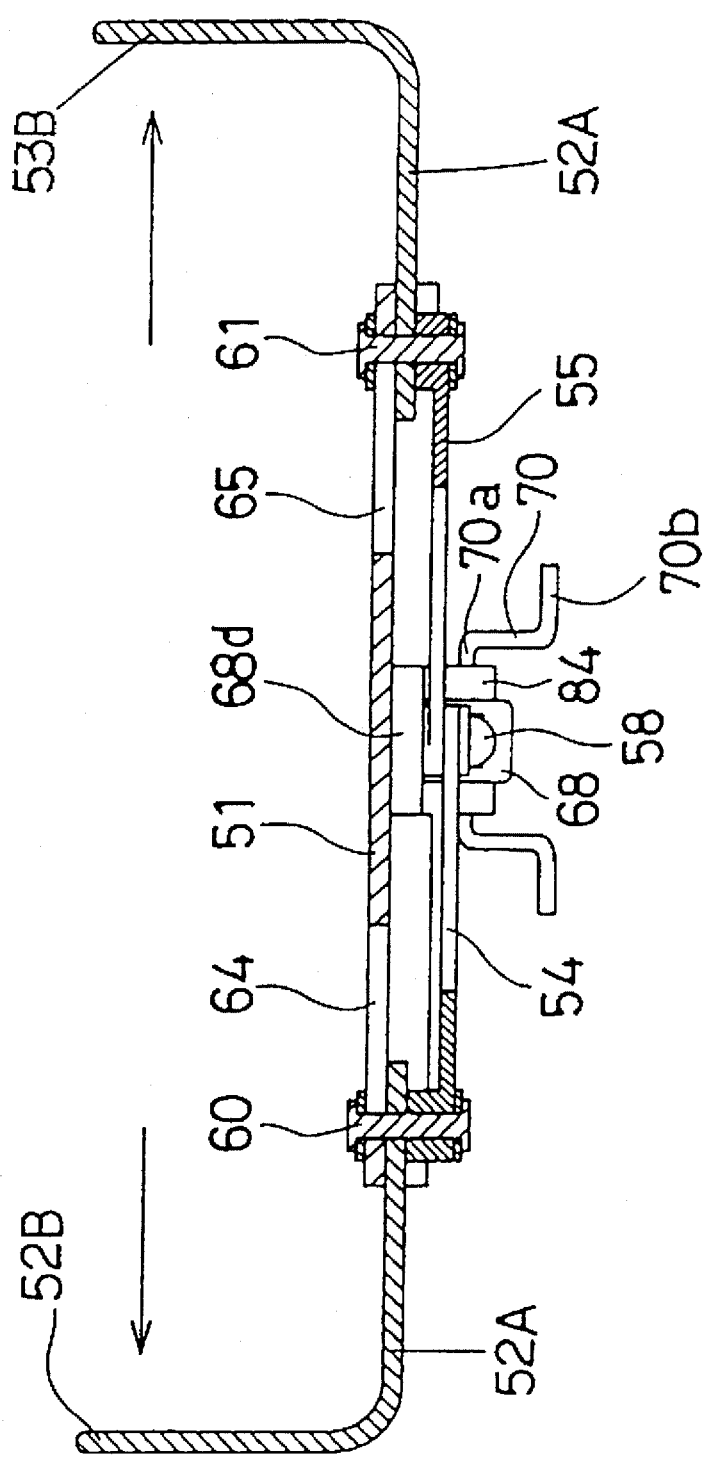
FIG. 20 is a sectional view taken along the line XX—XX in FIG. 15.

In the backrest portion 50 having the aforementioned structure, the slider 68 upwardly moves along the guide groove 83, and the first and second connecting pins 58 and 59 also upwardly move to push up the first to fourth connecting plates 54 to 57. However, second ends of the first to fourth connecting plates 54 to 57 are connected to the first to fourth driving pins 60 to 63 moving along the first to fourth guide slots 64 to 67 respectively, whereby the force pushing up the first to fourth connecting plates 54 to 57 outwardly slides the first to fourth driving pins 60 to 63 along the first to fourth guide slots 64 to 67 respectively. Thus, it is possible to crosswisely widen the side guards 52 and 53 in parallel with each other by raising up the slider 68, as shown in FIGS. 15, 17 and 20.

Figure 21:
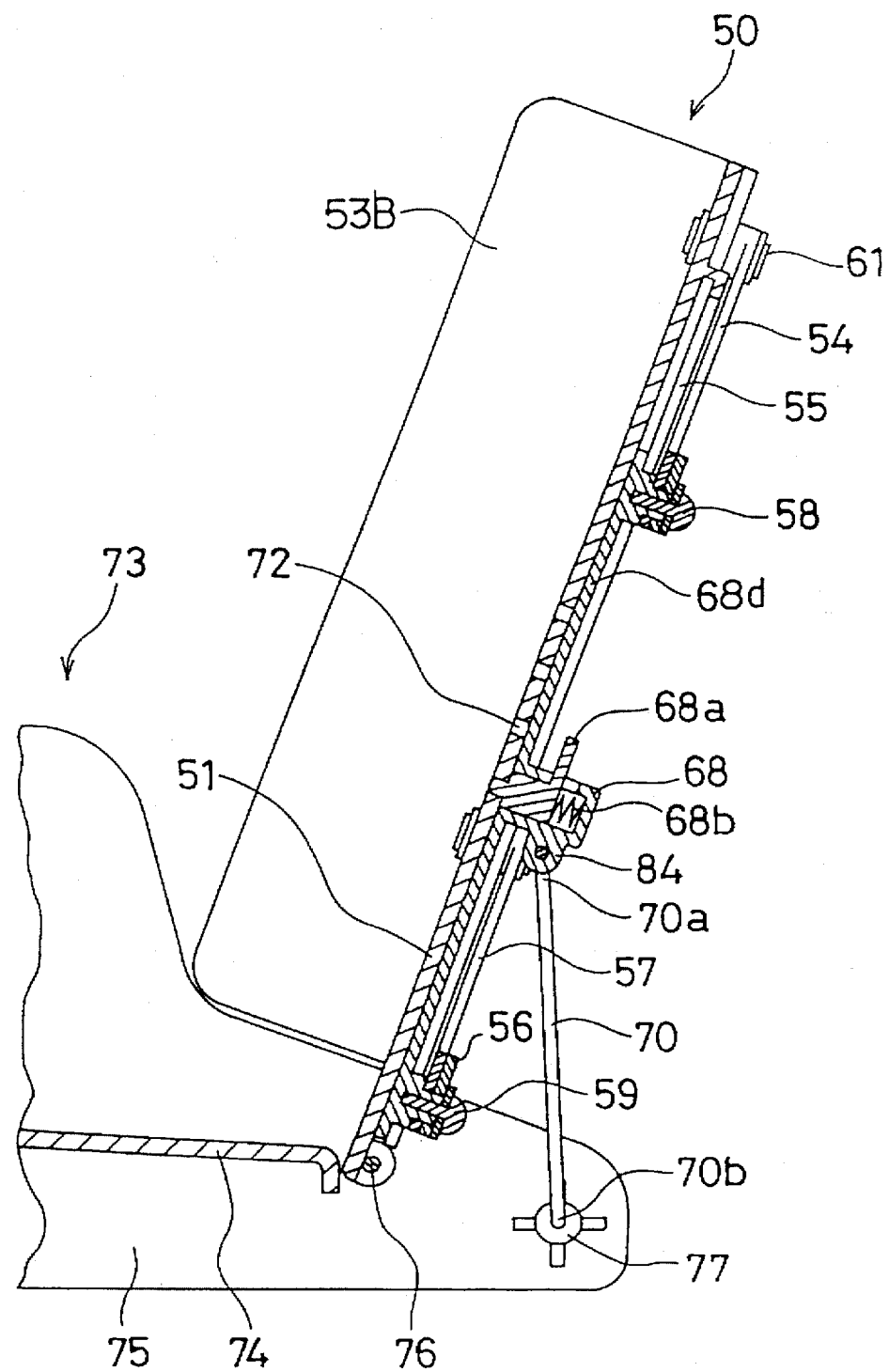
FIG. 21 is a first sectional view showing an interlocking state between the backrest portion and an inclination mechanism in the second embodiment.
Figure 22:
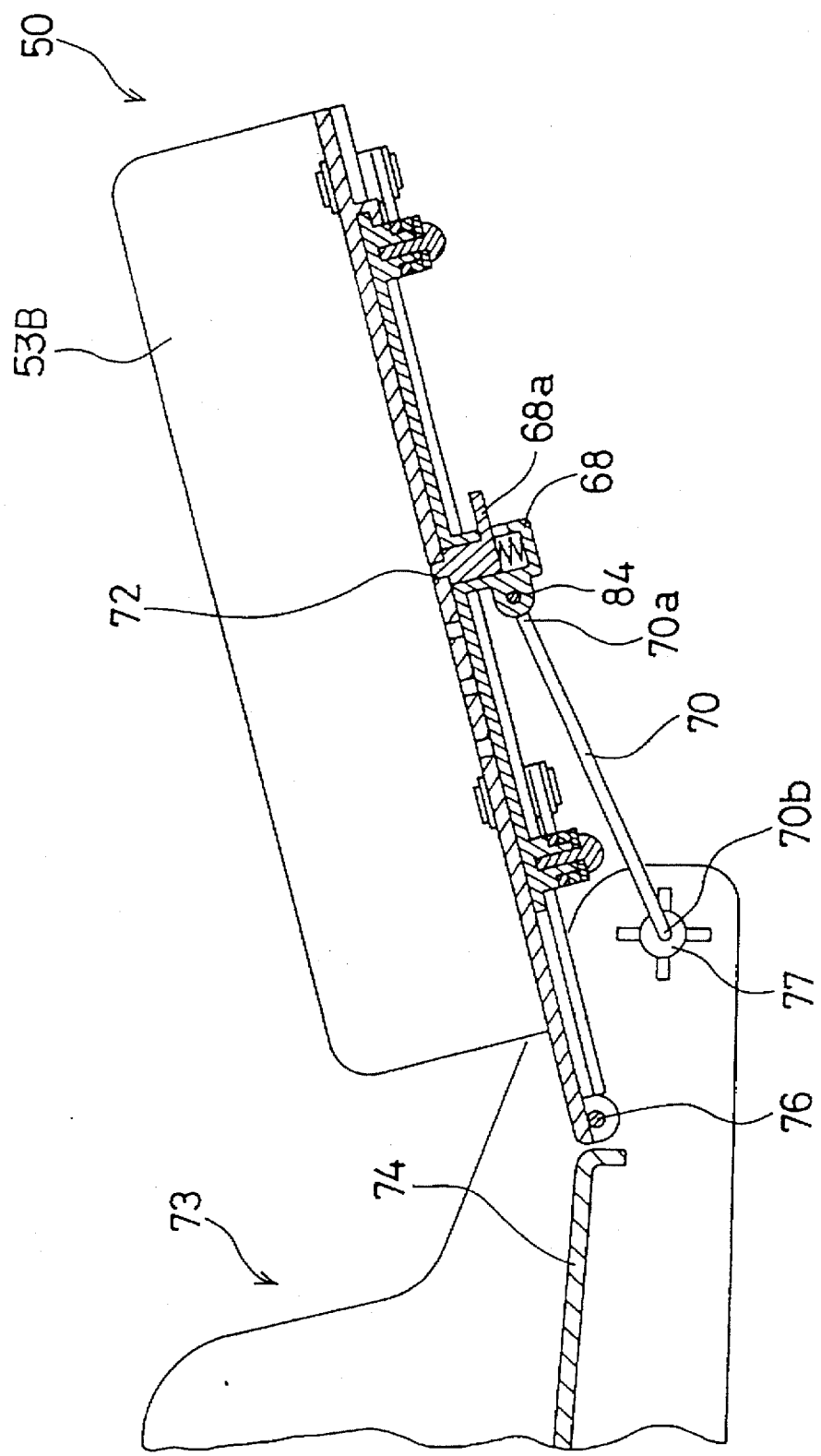
FIG. 22 is a second sectional view showing the interlocking state between the backrest portion and the inclination mechanism in the second embodiment.

With reference to FIGS. 21 and 22, the inclination of the backrest portion 50 will be described on the basis of the aforementioned structure. In the state shown in FIG. 21, the backrest portion 50 is most uprighted so that the upper end 70a of the bridging bar 70 is connected to the fixing portion 84, with the projection 68c of the stopper pin 68a in the lowermost one of the positioning holes 72 which are provided in the guide groove 83.

In order to incline the backrest portion 50 from this state, the stopper pin 68a is first raised up against the urging force of the spring 68b, to next allow gradually upwardly sliding the slider 68. At this time, the lower end 70b of the bridging bar 70 is pivotally rotatably supported by a support part 77, whereby the backrest portion 50 is rotated about a shaft 76. When the slider 68 is slid to the uppermost position, for example, the backrest portion 50 is most inclined as shown in FIG. 22. The backrest portion 50 can be readily uprighted again from the state shown in FIG. 22 by an operation opposite to the above.

As hereinabove described, the space between the first and second side guards 52 and 53 can be changed in association with the inclination of the backrest portion 51, so that this space can be horizontally widened as the backrest portion 50 is inclined.

(Third Embodiment)

A third embodiment of the present invention is now described with reference to FIGS. 23 to 25. While the space between the first and second side guards is changed in association with the inclination of the backrest portion in each of the aforementioned first and second embodiments, the space between first and second armrest portions is changed in association with the inclination of a backrest portion in the third embodiment.

Figure 23:
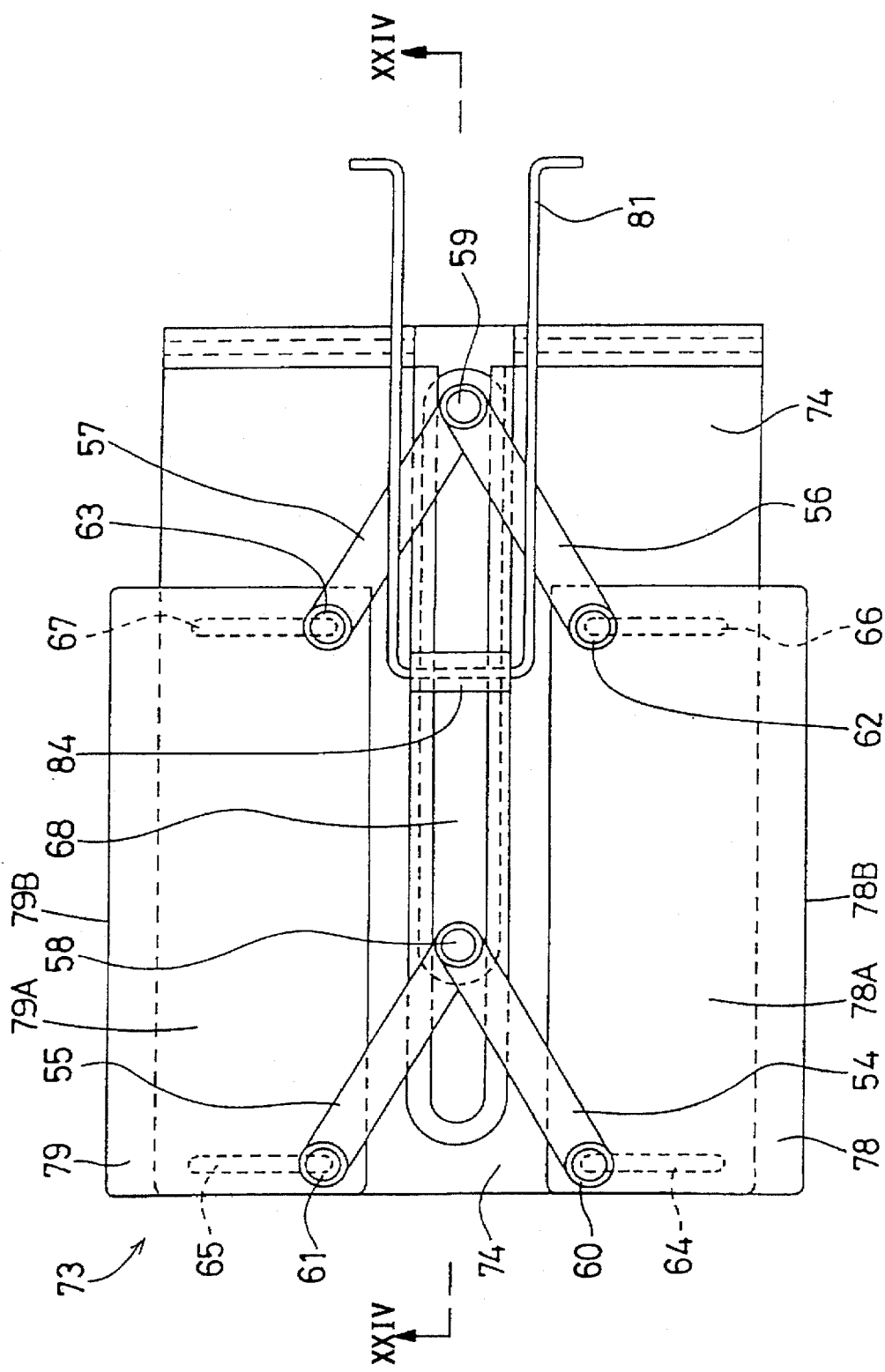
FIG. 23 illustrates the structure of a seat portion in a third embodiment of the present invention.

FIG. 23 is a bottom plan view of a seat part 73 which is in such a state that the space between first and second armrest portions 78 and 79 is most narrowed.

The first and second armrest portions 78 and 79 are provided with first and second major surface walls 78A and 79A extending along a seat portion 74 for positioning first and second armrests 78B and 79B on outer side edges respectively. Other structures of this embodiment are identical to those of the second embodiment shown in FIG. 14 except that a slider 68 is not provided with a stopper pin 68a and a working pin 81 is rotatably fixed to a working pin fixing portion 84 in the slider 68.

Figure 24:
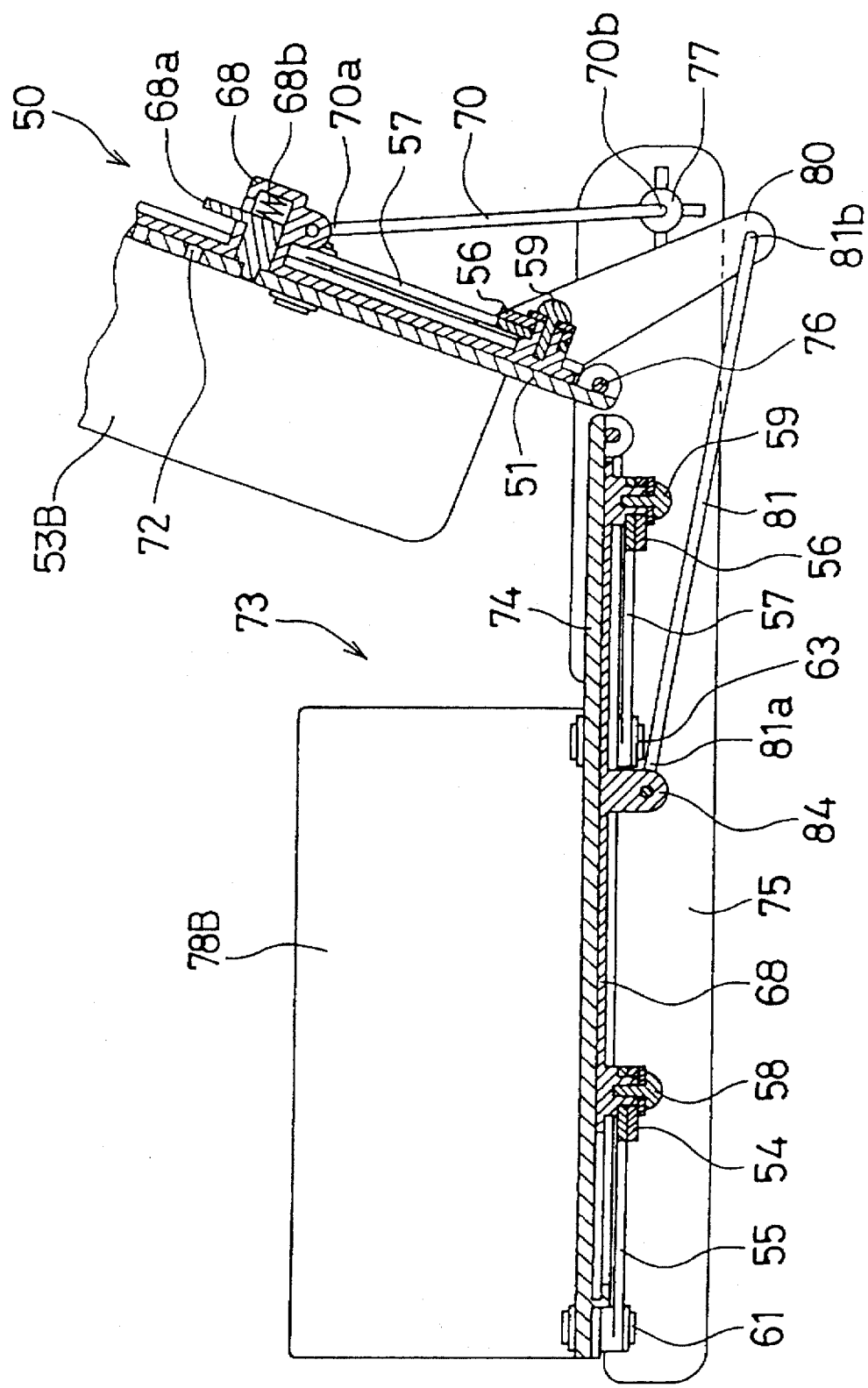
FIG. 24 is a first sectional view showing an interlocking state between the backrest portion and an inclination mechanism in the third embodiment.
Figure 25:
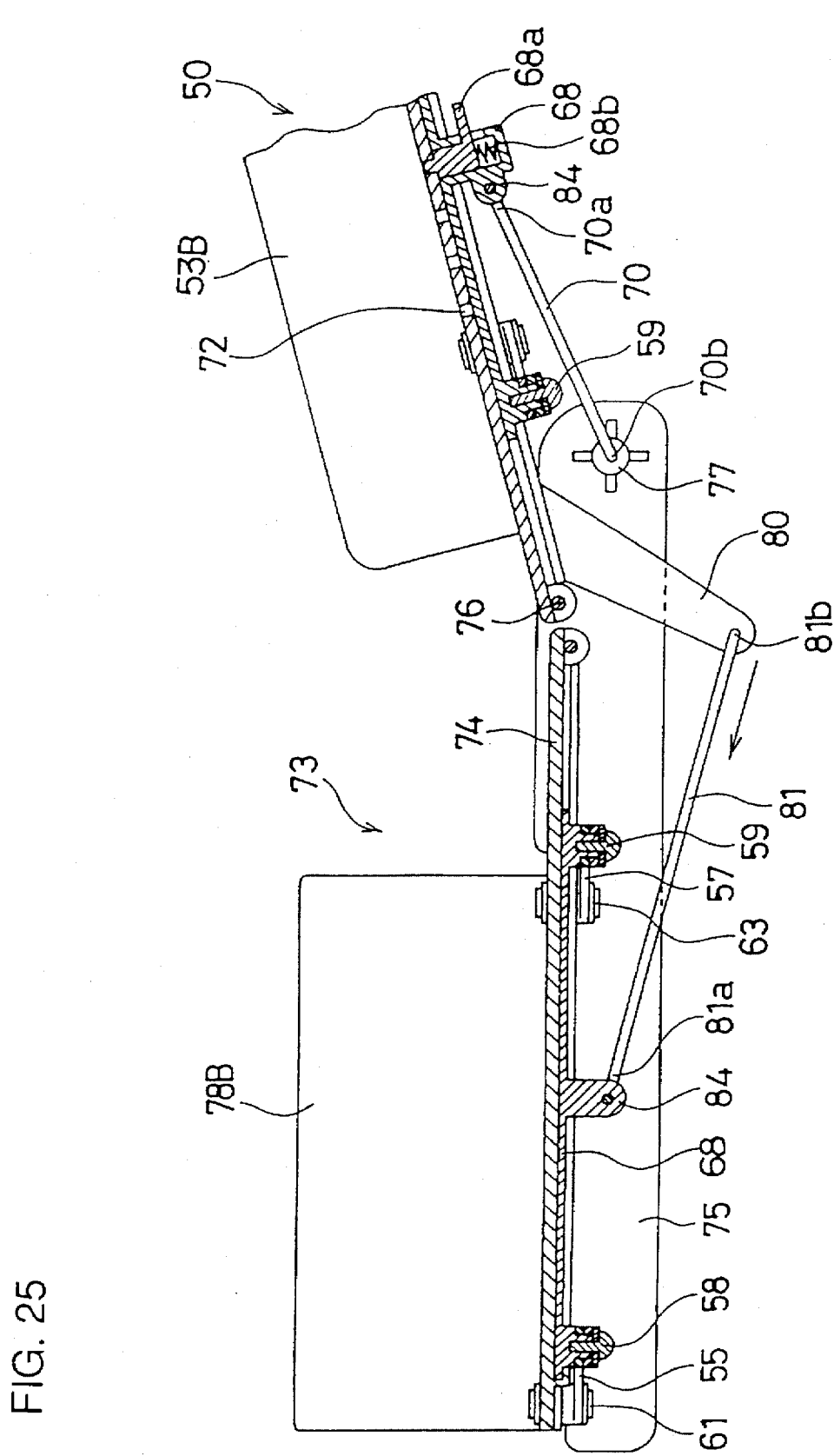
FIG. 25 is a second sectional view showing the interlocking state between the backrest portion and the inclination mechanism in the third embodiment.

Due to the aforementioned structure which is similar to that of the second embodiment, the space between the first and second armrest portions 78 and 79 is most narrowed when the slider 68 is at the rightmost position as shown in FIGS. 23 and 24, while the space is most widened when the slider 68 is at the leftmost position as shown in FIG. 25.

With reference to FIGS. 24 and 25, the structures for providing an interlocking between the inclination of a backrest portion 50 and the change of the space between the first and second armrest portions 78 and 79.

FIG. 24 shows the backrest portion 50 which is most uprighted. In this case, the space between the first and second armrest portions 78 and 79 is most narrowed.

A working plate 80 is mounted on a lower part of the backrest portion 50, to extend downwardly therefrom. A lower end 81b of the working pin 81 is rotatably mounted on a second or free end of the working plate 80.

From this state, if the backrest portion 50 is gradually inclined, then the working plate 80 is rotated with the backrest portion 50 about a shaft 76. Thus, the working pin 81 which is mounted on the second end of the working plate 80 moves in the direction of the arrow in FIG. 25, to leftwardly slide the slider 68. Thus, the space between the first and second armrest portions 78 and 79 is gradually widened as the backrest portion 50 is inclined.

When the backrest portion 50 is inclined, the horizontal spaces or widths of the seat portion 74 and the backrest portion 50 are widened due to the combination of the mechanisms in the second embodiment as shown in FIGS. 24 and 25, whereby a comfortable space for a child can be ensured.

(Fourth Embodiment)

A fourth embodiment of the present invention is now described with reference to FIGS. 26 to 28. In the fourth embodiment, an extension plate 69A is made to extend from a front part of a seat portion 74 in association with inclination of a backrest portion 50.

Figure 26:
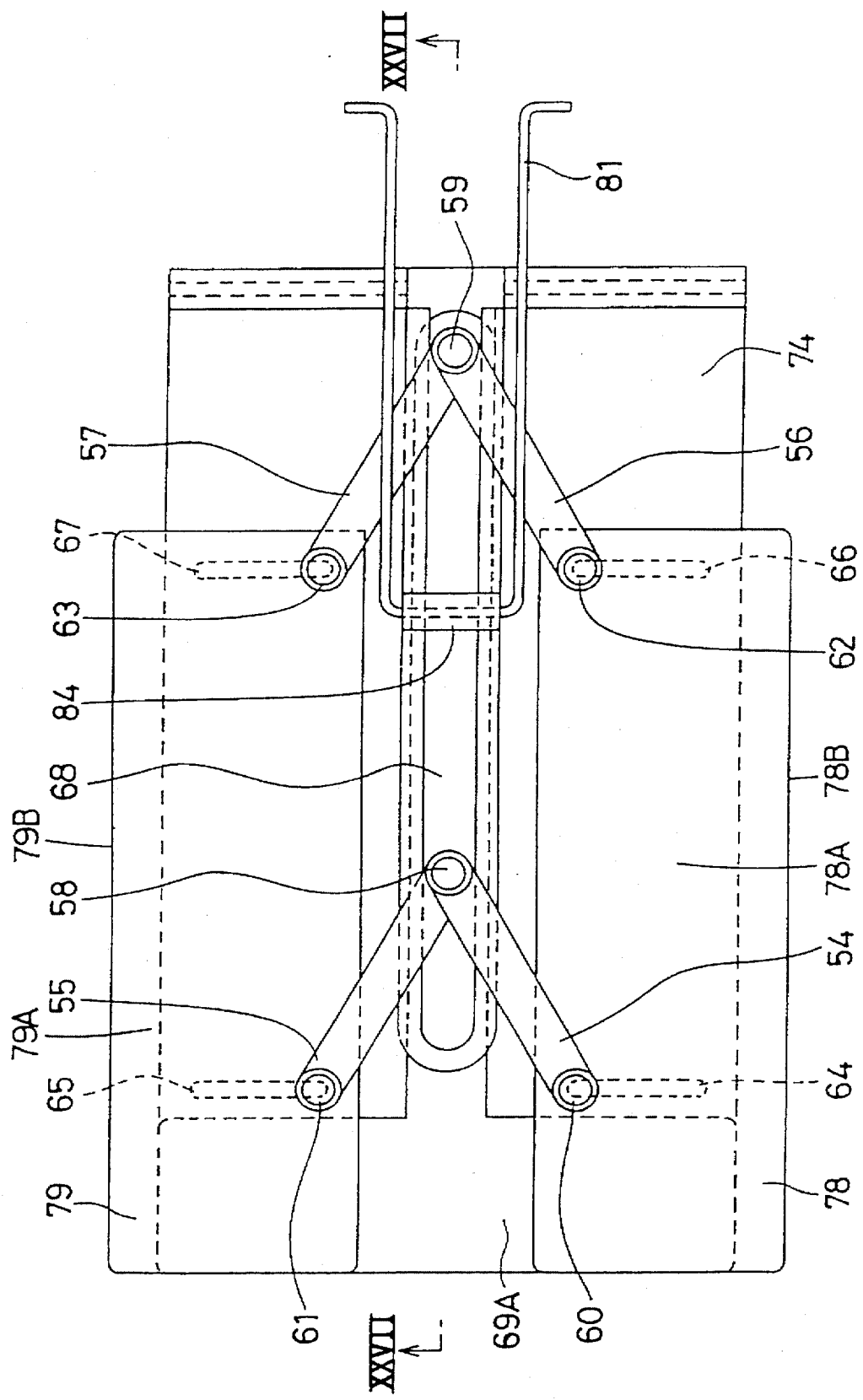
FIG. 26 illustrates the structure of a seat portion in a fourth embodiment of the present invention.
Figure 27:
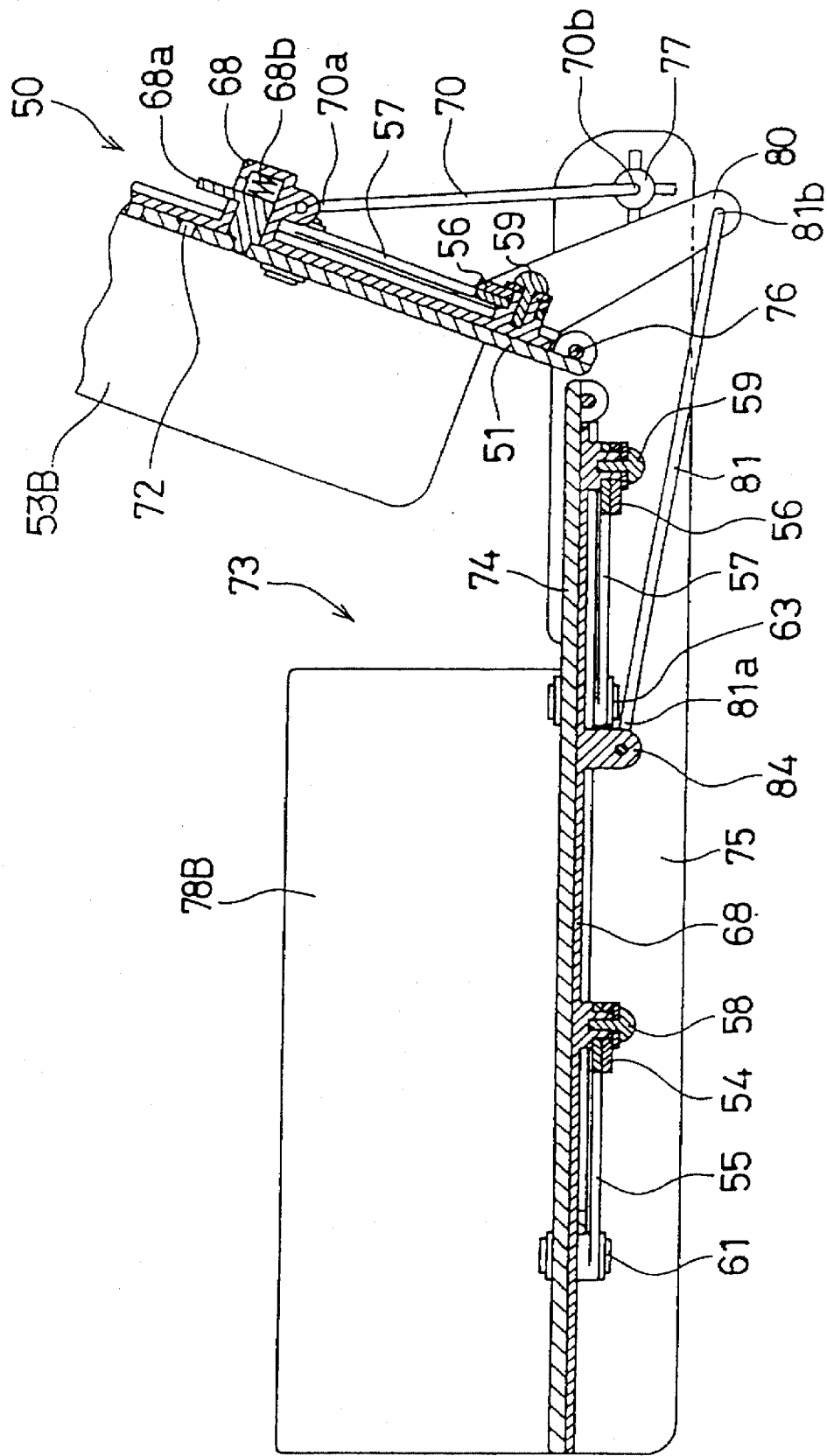
FIG. 27 is a first sectional view showing an interlocking state between the backrest portion and an inclination mechanism in the fourth embodiment.

FIG. 26 is a bottom plan view showing the seat portion 74. Dissimilarly to the structure of the third embodiment, the extension plate 69A is mounted on a front end of a slider 68. In relation to the aforementioned structure, FIG. 27 shows the backrest portion 50 which is in a most uprighted state, with the slider 68 at the rightmost position and the extension plate 69A retracted within and below the contour of the front edge of the seat portion 74.

Figure 28:
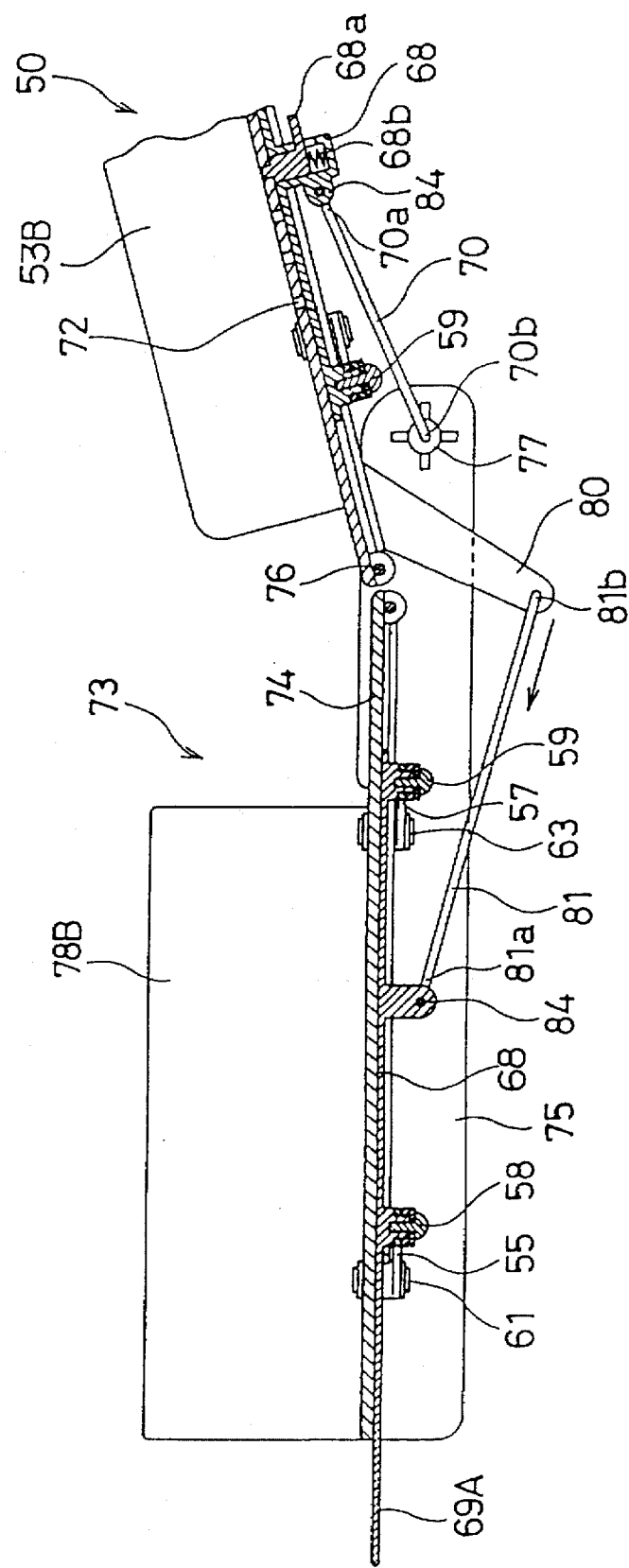
FIG. 28 is a second sectional view showing the interlocking state between the backrest portion and the inclination mechanism in the fourth embodiment.

When the backrest portion 50 is gradually inclined as shown in FIG. 28, the slider 68 moves leftwardly similarly to the third embodiment, whereby the extension plate 69A projects from the front part of the seat portion 74.

Thus, the extension plate 69A is provided to project from the front part of the seat portion 74 in association with inclination of the backrest portion 50. In combination with the aforementioned second or third embodiment, for example, the horizontal spaces of the seat portion 74 and the backrest portion 50 as well as the front space of the seat portion 74 can be widened or extended in an inclined state of the backrest portion 50, whereby a further comfortable space can be ensured for the child.

While the present invention has been described with reference to the first to fourth embodiments shown in the drawings, various modifications are available within the scope of the present invention.

Further, the mechanisms for changing the spaces between the first and second side walls and between the first and second armrests in association with the inclination of the backrest portions are not restricted to those employed in the embodiments, but can be replaced by various well-known interlocking mechanisms. In addition, the mechanism for adjusting the inclination of the backrest portion can also be replaced by another well-known mechanism.

While the drawings show only the members serving as bases for forming the seat portion 4, the backrest portion 5, the first and second side guards 7A and 7B and the head guard 8 respectively, a surface material which is filled or padded with a cushion material, for example, is arranged on these members serving as bases in the child chair 1 in practice. Such a surface material is arranged not to hinder the operations of the first and second side guards 7A and 7B, for example, as a matter of course.

While the above embodiments have been described with reference to child chairs 1, the present invention is also applicable to another type of child seat apparatus such as a baby carriage or a child safety seat for an automobile, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child seat apparatus comprising a seat including a seat portion and a backrest portion tiltably connected to and extending from a rear part of said seat portion so that said backrest portion is inclinable relative to said seat portion into at least one selected reclined position, at least one pair of guard members movably arranged at two side edges of said seat, and means for widening a lateral spacing distance between said pair of guard members as said backrest portion is inclined.

2. The child seat apparatus in accordance with claim 1, wherein said pair of guard members includes first and second side guards comprising a pair of side walls respectively extending frontwards from two side edges of said backrest portion, and said lateral spacing distance is a lateral spacing distance between said pair of side walls; and further comprising a first holding mechanism movably holding said first and second side guards respectively so that said lateral spacing distance between said pair of side walls is changeable; and wherein said means for widening said lateral spacing distance include a first interlocking mechanism for changing said spacing distance between said pair of side walls in interlocked association with said inclining of said backrest portion so that said spacing distance is widened as said backrest portion is inclined.

3. The child seat apparatus in accordance with claim 2, wherein said first and second side guards further comprise first and second major surface walls extending along said backrest portion with said side walls attached to said major surface walls so as to be positioned at said two side edges of said backrest portion respectively, and said first holding mechanism comprises a mechanism for movably supporting said first and second major surface walls with respect to said backrest portion.

4. The child seat apparatus in accordance with claim 3, further comprising a shaft arranged to provide said tiltable connection of said backrest portion to said seat portion, and a bridging bar having an upper end and a lower end, wherein said lower end is rotatably mounted at a position different from that of said shaft and said upper end is selectively fixable at any one of a plurality of positions that are vertically distributed on a rear surface of said backrest portion, in order to adjust said inclination of said backrest portion into said at least one selected reclined position, wherein said first holding mechanism comprises pivot pins rotatably connecting lower ends of said first and second major surface walls to said backrest portion, and wherein said interlocking mechanism comprises a pair of guide slots extending parallel to each other in said backrest portion, a pair of driven slots provided respectively in said major surface walls of said pair of side guards and extending at an angle relative to each other so as to approach closer toward each other at upper ends of said driven slots, and a pair of driving pins connected to said upper end of said bridging bar and being respectively vertically movably received in said guide slots and longitudinally movably received in said driven slots.

5. The child seat apparatus in accordance with claim 4, further comprising a head guard that is lengthwisely rotatably mounted on an upper end of said backrest portion, and a mechanism for transmitting a motion of said upper end of said bridging bar for said selective fixing at any one of a plurality of positions, to said head guard so that said head guard is rotated toward upright from said backrest portion when said backrest portion is inclined into a most reclined one of said at least one selected reclined position.

6. The child seat apparatus in accordance with claim 3, further comprising a shaft arranged to provide said tiltable connection of said backrest portion to said seat portion, and a bridging bar having an upper end and a lower end, wherein said lower end is rotatably mounted at a position different from that of said shaft and said upper end is selectively fixable at any one of a plurality of positions that are vertically distributed on a rear surface of said backrest portion, in order to adjust said inclination of said backrest portion into said at least one selected reclined position, wherein said first holding mechanism comprises: first and third horizontally extending guide slots respectively provided near upper and lower ends of said first major surface wall on said rear surface of said backrest portion, second and fourth horizontally extending guide slots respectively provided near upper and lower ends of said second major surface wall on said rear surface of said backrest portion, first and third driving pins respectively provided near said upper and lower ends of said first major surface wall and respectively received in said first and third guide slots so that said first major surface wall is movable along said first and third guide slots, and second and fourth driving pins respectively provided near said upper and lower ends of said second major surface wall and respectively received in said second and fourth guide slots so that said second major surface wall is movable along said second and fourth guide slots; and wherein said interlocking mechanism comprises:
a sliding plate pivotally supporting said upper end of said bridging bar and being vertically slidably arranged at a substantially central portion on said rear surface of said backrest portion, first and second connecting pins provided at upper and lower ends of said sliding plate respectively, first and third connecting plates connecting said first and second connecting pins with said first and third driving pins for horizontally sliding said first side guard in correspondence with a vertical movement of said sliding plate, and second and fourth connecting plates connecting said first and second connecting pins with said second and fourth driving pins for horizontally sliding said second side guard in correspondence with said vertical movement of said sliding plate.

7. The child seat apparatus in accordance with claim 1, wherein said pair of guard members includes first and second armrest portions comprising a pair of armrests upwardly extending from two side edges of said seat portion respectively, and said lateral spacing distance is a lateral spacing distance between said pair of armrests; and further comprising a second holding mechanism movably holding said first and second armrest portions respectively so that said lateral spacing distance between said pair of armrests is changeable; and wherein said means for widening said lateral spacing distance include a second interlocking mechanism for changing said spacing distance between said pair of armrests in interlocked association with said inclining of said backrest portion so that said spacing distance is widened as said backrest portion is inclined.

8. The child seat apparatus in accordance with claim 7, wherein said first and second armrest portions further comprise first and second major surface walls extending along said seat portion with said pair of armrests attached to said major surface walls so as to be positioned at said two side edges of said seat portion respectively, and said second holding mechanism comprises a mechanism for slidably supporting said first and second major surface walls with respect to said seat portion.

9. The child seat apparatus in accordance with claim 8, further comprising a working plate fixed to a rear surface close to a lower end of said backrest portion;

wherein said second holding mechanism comprises:
first and third crosswisely extending guide slots respectively provided near front and rear portions of said first major surface wall on a bottom surface of said seat portion, second and fourth crosswisely extending guide slots respectively provided near front and rear portions of said second major surface wall on said bottom surface of said seat portion, first and third driving pins respectively provided near said front and rear portions of said first major surface wall and respectively received in said first and third guide slots so that said first major surface wall is movable along said first and third guide slots, and second and fourth driving pins respectively provided near said front and rear portions of said second major surface wall and respectively received in said second and fourth guide slots so that said second major surface wall is movable along said second and fourth guide slots; and wherein said interlocking mechanism comprises:
a working pin having a rear end rotatably connected to said working plate, a sliding plate pivotally supporting a front end of said working pin and being lengthwisely slidably arranged at a substantially central portion on said bottom surface of said seat portion, first and second connecting pins provided respectively at front and rear ends of said sliding plate, first and third connecting plates connecting said first and second connecting pins with said first and third driving pins respectively for horizontally sliding said first armrest portion in correspondence with a lengthwise movement of said sliding plate, and second and fourth connecting plates connecting said first and second connecting pins with said second and fourth driving pins respectively for horizontally sliding said second armrest portion in correspondence with said lengthwise movement of said sliding plate.

10. The child seat apparatus in accordance with claim 9, further comprising an extension plate extending from a front portion of said sliding plate so as to project outwardly from a front part of said seat portion as said backrest portion is inclined and said sliding plate slides forward in said lengthwise movement.

11. The child seat apparatus in accordance with claim 1, wherein said at least one pair of guard members includes first and second side guards comprising a pair of side walls frontwardly extending from two side edges of said backrest portion respectively, and first and second armrest portions comprising a pair of armrests upwardly extending from two side edges of said seat portion respectively, and said lateral spacing distance includes a lateral spacing distance between said pair of side walls and a lateral spacing distance between said pair of armrests; and wherein said child seat apparatus further comprises:

a first holding mechanism movably holding said first and second side guards respectively so that said lateral spacing distance between said pair of side walls is changeable, a second holding mechanism movably holding said first and second armrest portions respectively so that said lateral spacing distance between said pair of armrests is changeable; and wherein said means for widening said lateral spacing distance includes a first interlocking mechanism for changing said spacing distance between said pair of side walls in interlocked association with said inclining of said backrest portion so that said spacing distance between said pair of side walls is widened as said backrest portion is inclined, and a second interlocking mechanism for changing said spacing distance between said pair of armrests in interlocked association with said inclining of said backrest portion so that said spacing distance between said pair of armrests is widened as said backrest portion is inclined.

12. A child seat apparatus comprising a seat including a seat bottom, and a backrest tiltably connected to said seat bottom so as to be inclinable relative to said seat bottom at any selected one of a plurality of reclining angles including a most-upright angle and a most-reclined angle, at least one pair of side guards respectively laterally movably arranged at two side edges of said seat and extending generally upwardly from said two side edges, and a mechanical motion drive linkage connecting said backrest with said side guards to transmit an inclining motion of said backrest as a lateral motion to said side guards such that a lateral spacing distance between said side guards is increased as said backrest is inclined from said most-upright angle to said most-reclined angle.

13. The child seat apparatus in accordance with claim 12, wherein said at least one pair of side guards comprises a pair of upper side guards arranged on said backrest.

14. The child seat apparatus in accordance with claim 13, further comprising two pivot pins respectively having an axis substantially perpendicular to a plane of said backrest, wherein said upper side guards are respectively pivotally connected to said backrest by said two pivot pins so that said upper side guards can pivot about said pivot pins in a plane substantially parallel to said backrest.

15. The child seat apparatus in accordance with claim 13, wherein said at least one pair of said guards further comprises a pair of lower side guards including armrests arranged on said seat bottom.

16. The child seat apparatus in accordance with claim 15, further comprising a plurality of laterally extending slots in said seat bottom, and a plurality of pins extending from said lower side guards respectively into said laterally extending slots, wherein said lower side guards are respectively slidably connected to said seat bottom so that said lower side guards can slide laterally relative to said seat bottom while remaining parallel to each other.

17. The child seat apparatus in accordance with claim 12, wherein said at least one pair of said guards comprises a pair of lower side guards including armrests arranged on said seat bottom.

18. The child seat apparatus in accordance with claim 12, further comprising a head guard tiltably connected to and extending from an upper free end of said backrest, and a second mechanical motion drive linkage connecting said backrest with said head guard to transmit said inclining motion of said backrest as a tilting motion to said head guard such that said head guard is tilted into a position substantially perpendicular to said backrest when said backrest is inclined to said most-reclined angle and is tilted into a position substantially parallel to said backrest when said backrest is inclined up to said most-upright angle.

19. The child seat apparatus in accordance with claim 12, further, comprising an extension plate slidable connected to a front portion of said seat bottom to be slidably extendable and retractable relative to a front edge of said seat bottom, wherein said extension plate is connected to said motion drive linkage.

* * * * *